(12) United States Patent
O'Reirdan et al.

(10) Patent No.: US 10,015,041 B2
(45) Date of Patent: Jul. 3, 2018

(54) PROVIDING NETWORK CONNECTIVITY FOR A SERVICE DISRUPTION

(71) Applicant: Comcast Cable Communications, LLC, Philadelphia, PA (US)

(72) Inventors: Michael J. O'Reirdan, Riverton, NJ (US); Phillip A. Sanderson, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/857,291

(22) Filed: Sep. 17, 2015

(65) Prior Publication Data

US 2017/0085417 A1 Mar. 23, 2017

(51) Int. Cl.
| | |
|---|---|
| *H04W 4/00* | (2018.01) |
| *H04L 12/24* | (2006.01) |
| *H04L 12/26* | (2006.01) |
| *H04W 24/04* | (2009.01) |
| *H04W 84/12* | (2009.01) |
| *H04W 92/12* | (2009.01) |

(52) U.S. Cl.
CPC ...... *H04L 41/0668* (2013.01); *H04L 43/0811* (2013.01); *H04W 24/04* (2013.01); *H04W 84/12* (2013.01); *H04W 92/12* (2013.01)

(58) Field of Classification Search
None
See application file for complete search history.

(56) References Cited

U.S. PATENT DOCUMENTS

| | | | |
|---|---|---|---|
| 9,078,137 B1* | 7/2015 | Chechani | H04W 12/08 |
| 2005/0202823 A1* | 9/2005 | Shaheen | H04W 36/0061 |
| | | | 455/436 |
| 2006/0153122 A1* | 7/2006 | Hinman | H04L 63/10 |
| | | | 370/328 |
| 2006/0187873 A1* | 8/2006 | Friday | H04W 48/20 |
| | | | 370/328 |
| 2008/0002642 A1* | 1/2008 | Borkar | H04L 45/16 |
| | | | 370/338 |
| 2009/0034470 A1* | 2/2009 | Nagarajan | H04L 12/1886 |
| | | | 370/331 |
| 2009/0252165 A1* | 10/2009 | Zhang | H04L 12/1854 |
| | | | 370/390 |
| 2010/0027522 A1* | 2/2010 | Mukai | H04W 4/00 |
| | | | 370/338 |

(Continued)

OTHER PUBLICATIONS

Lee Matthews. "Google Skybender project is testing 5G solar drones over New Mexico." http://www.geek.com/news/google-skybender-project-is-testing-5g-solar-drones-over-new-mexico-1646203/, Feb. 3, 2016.

(Continued)

*Primary Examiner* — Bob Phunkulh
(74) *Attorney, Agent, or Firm* — Banner & Witcoff, Ltd.

(57) ABSTRACT

According to some aspects, disclosed methods and systems may include receiving a message indicating a loss of connectivity to a network of a distressed device associated with a location. The method may include connecting, via one or more network devices, to the distressed device associated with the location. The method may also include transmitting information between the distressed device and the network.

20 Claims, 17 Drawing Sheets

(56) References Cited

U.S. PATENT DOCUMENTS

| | | | | |
|---|---|---|---|---|
| 2010/0074261 A1* | 3/2010 | Muhamed | H04L 12/4662 | 370/395.3 |
| 2010/0232337 A1* | 9/2010 | Das | H04W 4/12 | 370/312 |
| 2011/0158208 A1* | 6/2011 | Solanki | H04L 12/185 | 370/338 |
| 2011/0216744 A1* | 9/2011 | Taaghol | H04W 48/18 | 370/332 |
| 2012/0115430 A1* | 5/2012 | Hawkes | H04M 1/72536 | 455/404.1 |
| 2013/0033995 A1* | 2/2013 | Kraglund | H04W 48/16 | 370/252 |
| 2013/0052961 A1* | 2/2013 | Horner | H04W 24/08 | 455/67.11 |
| 2013/0128811 A1* | 5/2013 | Bradish | H04W 68/005 | 370/328 |
| 2013/0308470 A1* | 11/2013 | Bevan | H04W 64/00 | 370/252 |
| 2013/0318572 A1* | 11/2013 | Singh | H04W 12/08 | 726/4 |
| 2014/0036683 A1* | 2/2014 | Krishnamurthy | H04W 40/10 | 370/236 |
| 2014/0112242 A1* | 4/2014 | Vilmur | H04W 16/26 | 370/327 |
| 2014/0233412 A1* | 8/2014 | Mishra | H04W 72/085 | 370/252 |
| 2014/0341200 A1* | 11/2014 | Vukich | H04W 48/16 | 370/338 |
| 2015/0024787 A1* | 1/2015 | Ben-Ltzhak | H04L 12/18 | 455/456.4 |
| 2015/0098458 A1* | 4/2015 | Shen | H04W 48/20 | 370/338 |
| 2015/0117326 A1* | 4/2015 | Yenganti | H04W 40/248 | 370/329 |
| 2015/0304983 A1* | 10/2015 | Krening | H04W 64/003 | 370/254 |
| 2015/0358892 A1* | 12/2015 | Pandey | H04W 48/10 | 370/254 |
| 2016/0029430 A1* | 1/2016 | Mishra | H04W 36/30 | 370/254 |
| 2016/0286457 A1* | 9/2016 | O'hare | G01C 21/26 | |
| 2016/0344509 A1* | 11/2016 | Hayman | H04K 3/222 | |

OTHER PUBLICATIONS

Mark Harris. "Project Skybender: Google's secretive 5G internet drone tests revealed." The Guardian, http://www.theguardian.com/technology/2016/jan/29/project-skybender-google-drone-tests-internet-spaceport-virgin-galactic, dated Jan. 29, 2016.

Matt Hickey. "Report: Google Working on Awesome-Solar-Powered Broadband Drones for 5G Wireless Internet." Forbes Tech, http://www.forbes.com/sites/matthickey/2016/01131/report-google-working-on-awesome-solar-powered-broadband-drones-for-5g-wireless-internet/#67d55633d3aa <http://www.forbes.com/sites/matthickey/2016/01/31/report-google-working-on-awesome-solar-powered-broadband-drones-for-5g-wireless-internet, Jan. 31, 2016.

Ron Amadeo. "Report details Google's "Project Skybender," a 5G Internet drone program," ArsTechnica, http://arstechnica.com/gadgets/2016/02/report-details-googles-project-skybender-a-5g-internet-drone-program/, Feb. 1, 2016.

Ron Amadeo. "Google tells the FCC its secret airborne network is nothing to worry about," ArsTechnica, http://arstechnica.com/gadgets/2016/01/google-tells-the-fcc-its-secret-airborne-network-is-nothing-to-worry-about/, Jan. 29, 2016.

* cited by examiner

PROVIDING NETWORK CONNECTIVITY FOR A SERVICE DISRUPTION

BACKGROUND

Content providers and network operators have long sought how to provide network coverage to devices in the event of a loss or disruption of service. There is an ever-present need to allow for a lost cost, rapid deployment of technology to re-establish service, while taking into consideration any obstacles that may impair or delay physical or ordinary repairs to network components.

SUMMARY

The following summary is for illustrative purposes only, and is not intended to limit or constrain the detailed description.

A portion of a network may become disconnected from other portions of the network during outages. For example, during a storm, portions of a network may become disconnected, causing subscribers to lose access to the internet or other network services. Using mesh networking, network connections may be reestablished by dynamically routing traffic through the network.

Routers or other user devices that have been disconnected from the network may provide a notification that they have been disconnected. For example, if a router, or an access point, loses a connection to the internet, the router may broadcast a message or an identifier over a wireless network to indicate that the router does not have a connection to the internet.

Network vehicles may be used to provide temporary network connections during outages. For example, a network vehicle may provide a connection between a local office and a router that has been disconnected from the network. A network vehicle, or a technician, may scan a geographical area for routers indicating that they have lost connection to the network. The network vehicles may scan the geographical area to determine where outages have occurred.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, or wireless transmission media (e.g., air or space).

Figure 1:
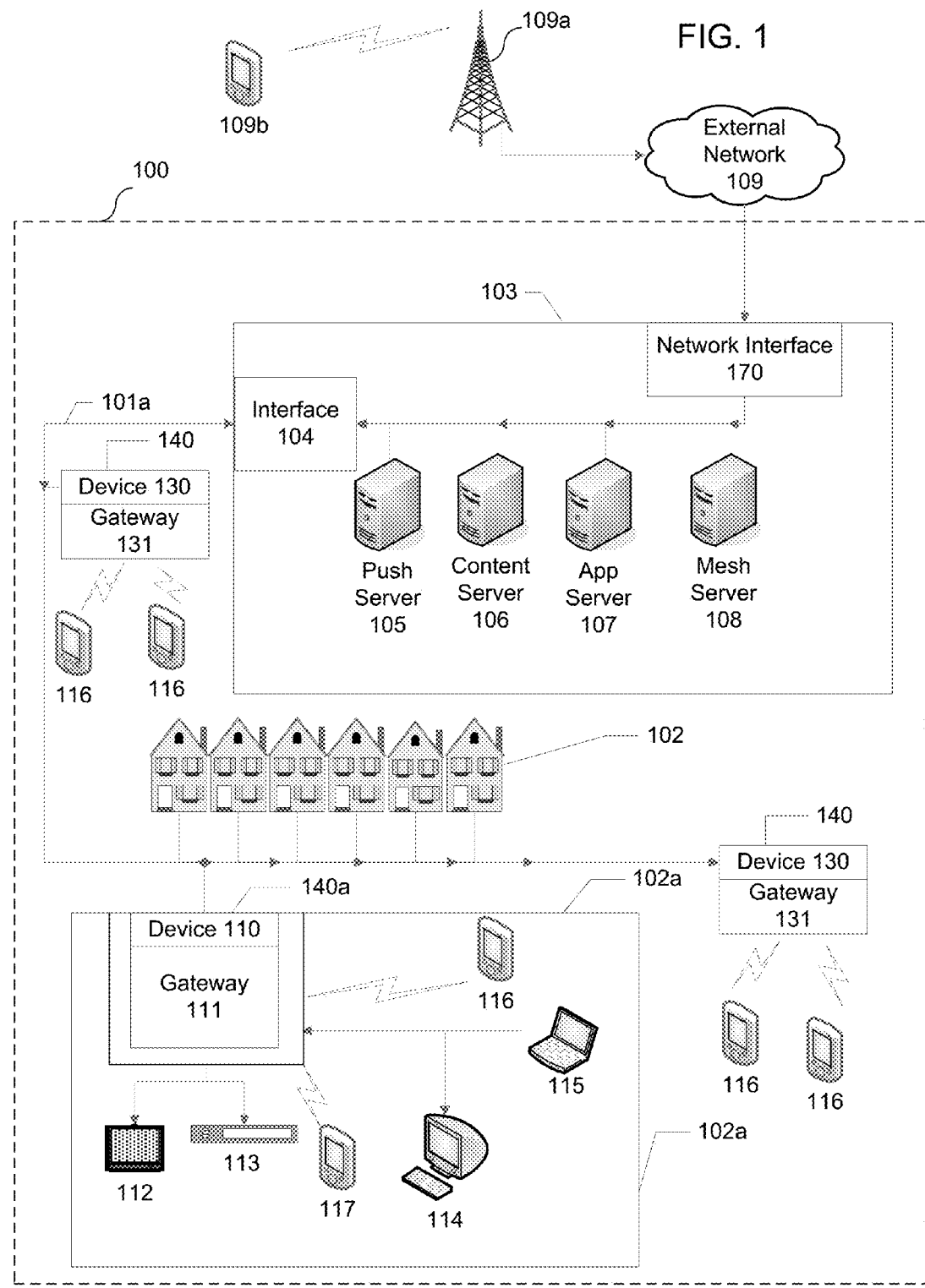
FIG. 1 illustrates an example communication network on which various features described herein may be used.

FIG. 1 illustrates an example communication network 100, such as a telecommunications or a content delivery network, on which many of the various features described herein may be implemented. The network 100 may be any type of information distribution network, such as satellite, telephone, cellular, wireless, etc. One example may be an optical fiber network, a coaxial cable network, or a hybrid fiber/coax (HFC) distribution network. Such networks 100 may use a series of interconnected communication lines 101*a* (e.g., coaxial cables, optical fibers, wireless links, etc.) to connect access nodes 140 and other locations 102 (e.g., businesses, homes, consumer dwellings, etc.) to a local office 103 (e.g., headend, central office, service provider, server, etc.). The local office 103 may transmit downstream information signals onto the lines 101*a* to the access nodes 140 and other locations 102. Each access node 140 and other locations 102 may have a receiver used to receive and process those signals.

There may be one line 101*a* originating from the local office 103, and it may be split a number of times to distribute the signal to various access nodes 140 and other locations 102 in the vicinity (which may be many miles) of the local office 103. Herein, the access nodes 140 may refer to hardware modules including e.g., a device 130, such as a modem, and a gateway interface 131. In some aspects, an access node 140 may refer to a wireless (e.g., Wi-Fi, etc.) hotspot that allows various user devices 116 (wireless laptops and netbooks, mobile phones, mobile televisions, personal digital assistants (PDA), etc.) to connect to network 100 and external networks 109 for access to various content, including content found over the Internet. The device 130 may include transmitters and receivers used to communicate on the lines 101*a* and with the local office 103. Within a given access node 140, the device 130 may be, for example, a coaxial cable modem (for the coaxial cable lines 101*a*), a fiber interface node (for the fiber optic lines 101*a*), or any other desired device. Meanwhile, the gateway interface device 131 may be a computing device (e.g., a router for wireless (e.g., Wi-Fi, etc.) connectivity, etc.) that communicates with the device 130 to allow one or more wireless devices 116 to communicate with the local office 103 and other devices beyond the local office 103, such as those devices connected to the external networks 109. The gateway 131 may also include wireless network interfaces (not shown) to provide communication signals to wireless devices 116. The access node 140 may transmit more than one wireless network identifier (e.g., a service set identifier (SSID), basic service set identifier (BSSID), or access network query protocol (ANQP) element). For example, the access node 140 may transmit one network identifier which is configurable by a subscriber or user and another network identifier which is only configurable by the service provider.

Meanwhile, the locations 102 may be any type of user premises, such as homes, businesses, institutions, etc. The lines 101*a* may include components not illustrated, such as splitters, filters, amplifiers, etc. to help convey the signal clearly. Portions of the lines 101*a* may also be implemented with fiber-optics, while other portions may be implemented with other types of lines or wireless communication paths.

The local office 103 may include an interface 104. For example, the interface 104 may be a termination system. In one type of network, the interface 104 may be a cable modem termination system (CMTS), or an optical termination system, which may be a computing device configured to manage communications between devices on the network of lines 101*a* and backend devices such as the servers 105-08 (described below). Backend devices such as the servers 105-08 may be located in close proximity to one another (e.g., in the same building) or far apart (e.g., separate cities, countries, etc.) and may be connected to one another over various communication platforms, including, for example, over a cloud computing environment. The interface 104 may be as specified in a standard, or in conformance with the standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as devices 130 or 110 (e.g., modems) at the various access nodes 140 and other locations 102, and to receive upstream communications from the devices 130 or 110 on one or more upstream channels or frequencies.

The local office 103 may also include one or more network interfaces 170, which may permit the local office 103 to communicate with various external networks 109. That is, the network interface 170 may include circuitry to communicate with one or more external networks 109 and their corresponding devices. These external networks 109 may include, for example, networks of Internet devices, telephone networks, cellular telephone networks, fiber optic networks, local wireless networks (e.g., WiMAX), satellite networks, or other types of network. For example, the external network 109 may include a cellular telephone network 109*a* and corresponding cell phones 109*b*.

As noted above, the local office 103 may include a variety of servers 105-08 that may be configured to perform various functions, including providing content to access nodes 140 and other locations 102, the cell phones 109*b*, and other devices on the external networks 109. For example, the local office 103 may include a push notification server 105. One or more push notification servers 105 may generate push notifications to deliver data or commands to various access nodes 140 and other locations 102 in the network (or more specifically, to the devices in access nodes 140 and other locations 102 that are configured to detect such notifications). The local office 103 may also include content servers 106. The one or more content servers 106 may be one or more computing devices that are configured to provide content to users at the access nodes 140 or the locations 102. This content may be, for example, video on demand movies, television programs, songs, text listings, etc. The content servers 106 may include software to validate user identities and entitlements, locate and retrieve requested content, encrypt the content, and initiate delivery (e.g., streaming) of the content to the requesting user or device.

The local office 103 may also include one or more application servers 107. An example application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an example application server 107 may be responsible for collecting data such as television program listings information and generating a data download for electronic program guide listings. An example application server 107 may be responsible for monitoring user viewing habits and collecting that information for use in selecting advertisements. An example application server 107 may be responsible for formatting and inserting advertisements in a video stream being transmitted to the access nodes 140 and other locations 102. An example application server 107 may be responsible for receiving user remote control commands, and processing them to provide an intelligent remote control experience.

An example location 102a (e.g., one of locations 102) may include an access node 140a, which may be similar or the same as the access node 140. The access node 140a can include any communication circuitry needed to allow a device to communicate on one or more lines 101a with other devices in the network. The access node 140a may comprise a device 110, such as a modem, which may also include transmitters and receivers used to communicate on the lines 101a and with the local office 103. The device 110 may be, for example, an embedded digital voice adapter (eDVA), an embedded multimedia adapter (eMTA), a coaxial cable modem (for coaxial cable lines 101), a fiber interface node (for the fiber optic lines 101), a twisted-pair telephone modem, a cellular telephone transceiver, a satellite transceiver, a local Wi-Fi router or access point, or any other modem device. Also, although only one modem is shown in FIG. 1, a plurality of modems operating in parallel may be implemented within the access node 140a. The device 110 may be connected to, or be a part of, a gateway interface device 111. Similar to the gateway interface device 131, the gateway interface device 111 may be a computing device that communicates with the device 110 to allow one or more other devices at the location 102a to communicate with the local office 103 and other devices beyond the local office 103, such as those devices connected to the external networks 109. In some embodiments, the gateway interface device 111 may operate to communicate with devices 112-16 located over a smaller distance than the distance between gateway 131 and user devices 116. The gateway 111 may be a set-top box (STB), a digital transport adapter (DTA), a digital video recorder (DVR), computer server, or any other desired computing device. The gateway 111 may also include local network interfaces (not shown) to provide communication signals to devices 112-16 at the location 102a, such as display devices 112 (e.g., televisions), additional STBs or DVRs 113, personal computers 114, laptop computers 115, wireless devices 116 (e.g., wireless routers, wireless laptops and netbooks, notebooks, tablets, cordless phones, mobile phones, mobile televisions, personal digital assistants (PDAs), etc.), landline phones 117 (e.g. Voice over Internet Protocol (VoIP) phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), or Bluetooth interfaces.

In addition to the examples of the term "access node" provided herein, the term "access node," "wireless access node," "access point," or "wireless access point" as used herein may also refer to one or more devices at the locations 102 including, for example, an interface device, the device 110 (e.g., a cable modem such as an eMTA or a wireless router to provide a Wi-Fi hotspot), the devices 116, or any other computing device discussed in connection with sample location 102a. According to some aspects, the term access node may refer to one or more mobile or stationary wireless devices, such as network vehicles.

In addition, the local office 103 may include one or more node location servers or mesh servers 108 to receive data (e.g., wireless coverage data, global positioning system (GPS) data, signal strength data, etc.) collected by various deployed access nodes. The mesh server 108 may analyze the collected data to generate estimate locations of access points unknown to the example mesh server 108 and to estimate coverage data (e.g., maps) of the area. In performing these functions, an example mesh server 108 may also request, collect, store, and analyze various data from the access nodes 140 including system information (e.g., maps), or wireless (e.g., Wi-Fi) received signal strength indicator (RSSI) levels, SSID, communication channel information, and device identifier information of access points operating in the area.

The mesh server 108 may model potential wireless mesh networks and may create one or more wireless mesh networks (e.g., an ad hoc Wi-Fi network) by sending instructions or configuration files to the access nodes 140 to form the one or more wireless mesh networks. A wireless mesh network may include one or more access nodes 140. The wireless mesh network may be formed by bridging the wireless connections of neighboring access nodes 140 with one another to enable communication between the access nodes 140. Each wireless mesh network may include one or more egress access nodes (e.g., the access nodes 140 that have connectivity over a distribution network to the local office 103). The distribution network may include one or more devices of the local office 103 (e.g., a CMTS) or one or more lines 101a connected to that particular access node 140 from which the access node 140 typically receives service from the local office 103.

Once a wireless mesh network is established among multiple access nodes 140, the mesh server 108 may configure the access nodes 140 to perform a number of functions. In one example, the access nodes 140 may detect and report the detection of devices or other access nodes 140 to the mesh server 108. The mesh server 108 may determine if there has been a theft of service based on, for example, a comparison of where an access node 140 is determined to be approximately located (e.g., based on information received from a network vehicle) and the location of the access node 140 stored in a database of the local office 103. In another example, the mesh server 108 may provision or enable one or more particular access nodes 140 to receive a bandwidth and a data speed greater than that of the maximum bandwidth capacity and data speed of allocated to a user or of particular lines 101a connected to those particular access nodes 140. For example, the particular access points 140 may, using the wireless mesh network, connect to one or more other access nodes 140 that are connected to one or more different lines 101a to receive the additional bandwidth or throughput. In another example, the mesh server 108 may transmit messages to each access node 140 through one or more wireless mesh networks. Each access node 140 may, upon receiving the message, output the message to its user (e.g., subscriber, customer, etc.) and may forward (e.g., relay or propagate) the message to other access nodes 140. In yet another example, the mesh server 108 may configure the access nodes 140 to establish the one or more wireless mesh networks in response to an emergency or disaster affecting one or more distribution networks. For example, the mesh server 108 or the access nodes 140 may begin establishing the wireless mesh network in response to determining a loss or decrease of network connectivity over one of the distribution networks for a predetermined time period.

In one implementation the push server 105, the content server 106, the application server 107, the mesh server 108, or combinations thereof, may be combined. Further, in FIG. 1, the push server 105, the content server 106, the application server 107, and the mesh server 108 are shown generally, and it will be understood that they may each contain memory storing computer executable instructions to cause a processor to perform steps described herein or memory for storing data.

Figure 2:
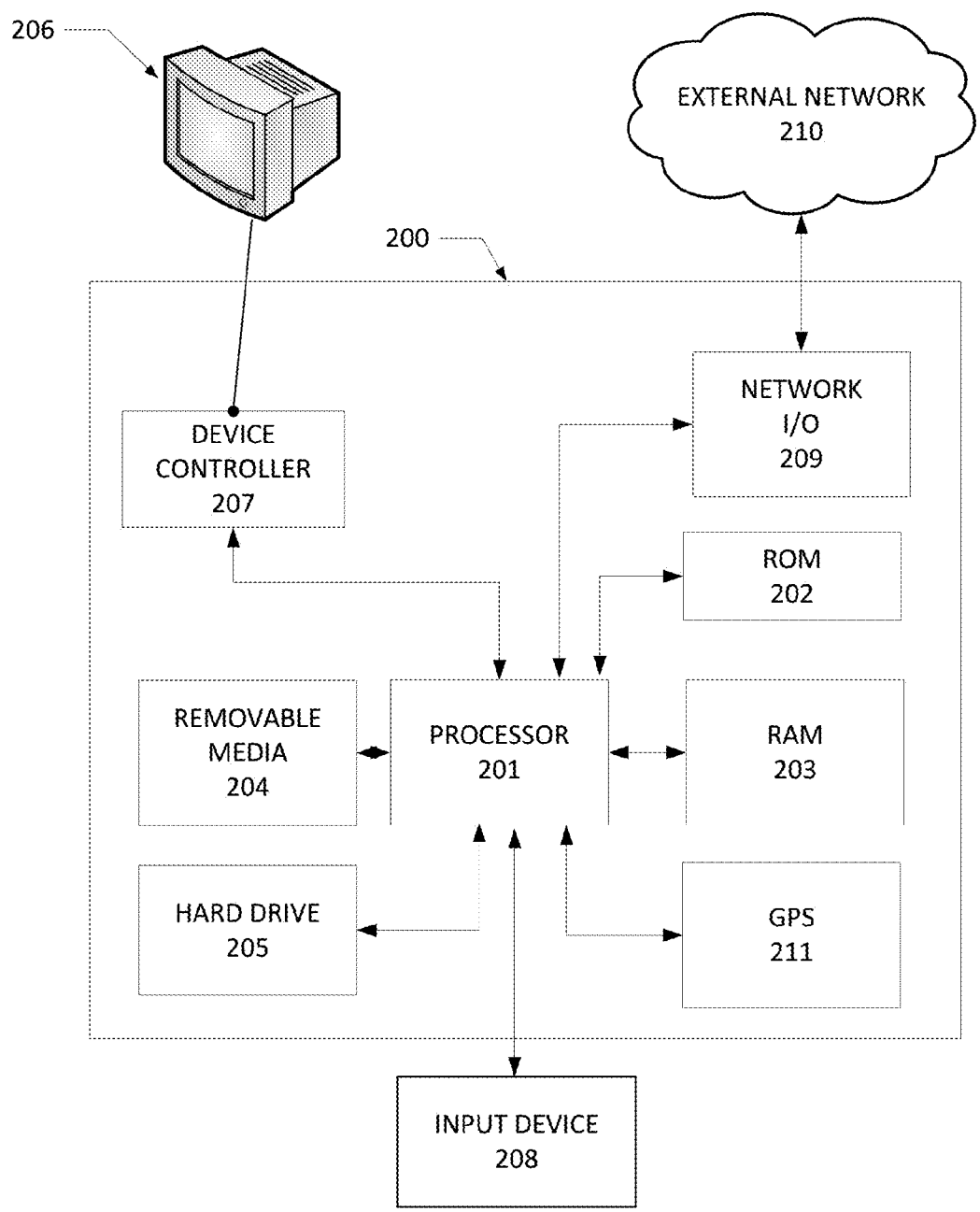
FIG. 2 illustrates an example computing device that can be used to implement any of the methods, servers, entities, and computing devices described herein.

FIG. 2 illustrates an example computing device 200 that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, removable media 204, such as a Universal Serial Bus (USB) drive, compact disk (CD) or digital versatile disk (DVD) drive, or floppy disk drive, or any other desired electronic storage medium. Instructions or other data may also be stored in an attached (or internal) hard drive or data repository 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces 209, such as input or output circuits (e.g., a network card) to communicate with a network 210. The network interface 209 may be a wired interface, wireless interface, or a combination of the two. In some embodiments, the network interface 209 may include a device (e.g., a cable modem), and the network 210 may include the communication lines 101*a* discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device. One or more computing devices discussed herein may include some or all of the components discussed in FIG. 2, along with additional components.

FIG. 2 illustrates an example of a hardware configuration. In one implementation, all or a portion of the illustrated components in FIG. 2 may be implemented as software. Modifications may be made to add, remove, combine, divide, or otherwise modify components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

Figure 3:
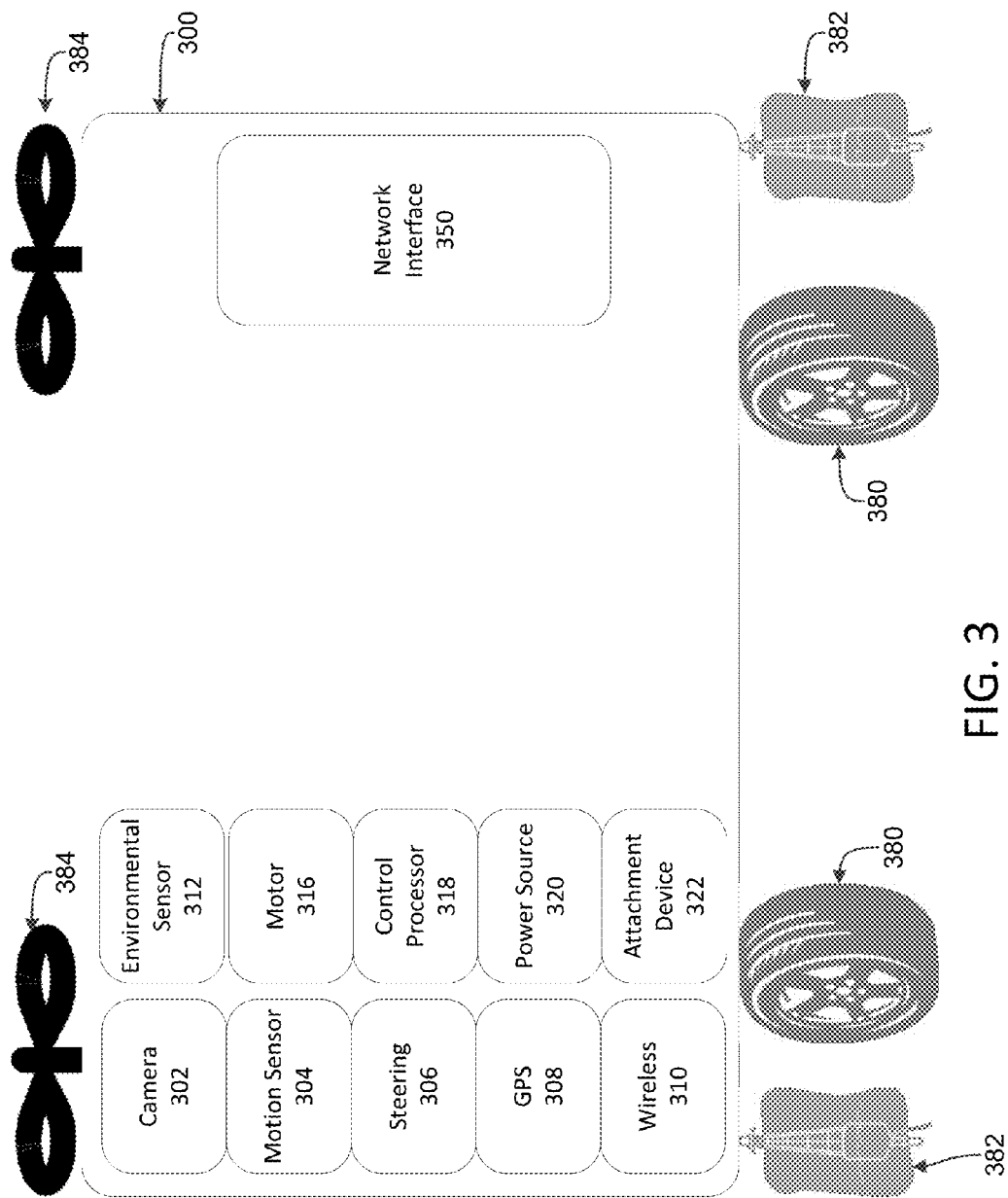
FIG. 3 illustrates an example network vehicle system in accordance with aspects of the present disclosure.

FIG. 3 illustrates an example network vehicle system 300, which may be referred to as a mobile network vehicle device, in accordance with one or more disclosed features described herein. The network vehicle 300 may be a self-deploying device that may provide access to a communication network to other devices, such as access to the network 100. In one implementation, the network vehicle 300 may serve as the access point 140. According to some aspects, the network vehicle 300 may be a drone device equipped with semi-self-motive or fully-self-motive capability (discussed below) or a device with little to no motive capability (such as a stationary device). Additionally or alternatively, the network vehicle 300 may be an unmanned or remotely piloted vehicle (e.g., unmanned or remote controlled aircraft, watercraft, land-craft, etc.), and may be a land, air, or water-borne vehicle. The network vehicle 300 may also be a manned vehicle, which may be operated by an on-board user (e.g., a user driving or operating the network vehicle 300 while in or on the network vehicles 300). The network vehicle 300 may be an aerostat, a pseudo satellite, an airship, or a device configured for a pseudo orbit.

The network vehicle 300 may connect to the backhaul or backbone (e.g., line 101*a*, interface 104, network interface 170, servers 105-08, or the like) of the network 100 via a network interface 350, which may be similar to the network interface 170. According to some aspects, the network interface 350 may comprise network channels defined by the IEEE 802.11 standards. The network interface 350 may comprise one or more of the following connection types or protocols: 3G, 4G, LTE, DSL, cable, Ethernet, optical, light, Wi-Fi, satellite, and the like. According to some aspects, the network interface 350 may comprise a cable or wire that may connect to line 101*a* or to a similar type connection.

The network vehicle 300 may comprise a steering mechanism 306. The network vehicle 300 may use the steering mechanism 306 to control the movement of the network vehicle 300. For example, the network vehicle 300 may use the steering mechanism 306 to control one or more transportation devices configured to move the network vehicle 300, such as one or more ground movement devices 380 (e.g., wheels, treads, tracks, etc. for ground movement), one or more floating devices 382 (e.g., buoyancy devices for liquid movement), or one or more air movement devices 384 (e.g., wings, propellers, etc. for air movement). The network vehicle 300 may use the steering mechanism 306 to control a motor 316, which may provide motive power to the network vehicle 300 via one or more of the transportation devices 380, 382, or 384. For example, the network vehicle 300 may use the steering mechanism 306 to operate the motor 316 and the floating device 382 to move on, in, or through liquid. In another example, the network vehicle 300 may use the steering mechanism 306 to operate the motor 316 and the air movement device 384 to fly or hover at or around a particular location. In another example, the network vehicle 300 may use the steering mechanism 306 to operate the motor 316 and the ground movement device 380 to roll from one location to another. According to some aspects, after a network vehicle 300 has moved to a location, the network vehicle 300 may use an attachment device 322 to attach to an object (e.g., the ground, building, etc.). The attachment device 322 may be any material or object that can be used by the network vehicle 300 to attach to objects, such as Velcro, a sticky material, a hook, a latch, a bar, rubber, glue, a magnet, cement, etc.

The network vehicle 300 may comprise a camera 302, which may be used by the network vehicle 300 to capture images of the surrounding area. According to some aspects, camera 302 may be controlled by the local office 103 or other entity (e.g., another service provider, another user, a server or computing device, another network vehicle, an access device, a cloud-based service or a server, etc.). For example, the local office 103 or other entity may be able to navigate the network vehicle 300 using visual images or video provided by the camera.

The network vehicle 300 may comprise a motion sensor 304, which may be used by the network vehicle to detect the motion of objects in a general proximity to the network vehicle. For example, the network vehicle 300 may use the motion sensor 304 to detect that an object, such as a car, is approaching the network vehicle 300. The network vehicle 300 may then move (such as using the steering mechanism 306) such that the car might not contact or damage the network vehicle 300.

The network vehicle 300 may comprise a GPS device 308 that may be used by the local office 103 or other entity to determine or approximate a location of the network vehicle 300. According to some aspects, the network vehicle 300 may use the GPS device 308 to determine the location of the network vehicle 300 in relation to another object, for example, the GPS may be used to determine a latitude and longitude, address or street location, or the like. For example, the local office 103 may instruct the network vehicle to move to a location or address associated with a particular access point 140. The network vehicle 300 may then use information provided by the GPS device 308 to move to that location.

The network vehicle 300 may comprise one or more wireless interfaces 310. The wireless interface 310 may operate in accordance with the IEEE 802.11 standards. The wireless interface 310 may comprise a receiver that may be configured to receive information via a wireless or Wi-Fi signal. The wireless interface 310 may comprise a transmitter that may be configured to transmit information via a wireless or Wi-Fi signal. According to some aspects, the wireless interface 310 may use wireless protocols that may include 3G, 4G, LTE, DSL, cable, Ethernet, optical, light, Wi-Fi, satellite, and the like. The network vehicle 300 may use the wireless interface 310 to connect to other devices, such as access points (e.g., the access point 140), another network vehicle 300, or wireless devices (e.g., the wireless device 116). The network vehicle 300 may then provide, to these connected devices, access to network resources associated with a service provider (e.g., the local office 103 or another entity), which the network vehicle 300 may be connected to via the network interface 350. In one implementation, data may be routed between the network and the connected devices based on the type of data transmitted. For example, a small data item, such as an email or a text message, may be routed in a manner (e.g., via a cellular connection) that may be different than a larger data item, such as a streaming video download or upload (e.g., via a Wi-Fi or satellite connection). In addition, data may be routed based on the capabilities of the network vehicle 300 or the devices to which the network vehicle 300 may connect. For example, the network vehicle 300 may only be capable of connecting via a Wi-Fi connection, and thus may only be able to provide access to a network via a Wi-Fi connection. Also, in another example, a wireless device may only be capable of connecting via a cellular connection, and thus may only be able to connect to a network vehicle 300 via a cellular connection.

The network vehicle 300 may comprise one or more environmental sensors 312, which may be used by the network vehicle to detect features associated with the environment in proximity to the network vehicle 300. The network vehicle 300 may use the sensor 312 to detect objects in proximity to the network vehicle 300. For example, the network vehicle 300 may use the sensor 312 to determine whether the network vehicle 300 is about to hit a wall. According to some aspects, the network vehicle 300 may use the sensor 312 to determine the temperature of an object (e.g., temperature of water, the ground, a building, etc.) or an atmospheric condition (e.g., air temperature, humidity, etc.).

The network vehicle 300 may comprise a control processor 318, which may execute instructions of a computer program to perform any of the features described herein. The control processor 318 may interact with one or more cloud-based resources (e.g., controlled by the local office 103 or other entity) that may instruct the control processor 318 on how to operate the network vehicle 300. According to some aspects, the control processor 318 may control (e.g., autonomously or via another entity) the operation of other components of the network vehicle 300. For example, the control processor 318 may control the amount of motive power provided by motor 316. The control processor 318 may control the operation of the GPS device 308, the wireless interface 310, the steering mechanism 306, the motion sensor 304, the camera 302, the environmental sensor 312, the power source 320, the attachment device 322, the ground movement device 380, the floating device 382, the air movement device 384, and the like. The control processor 318 may also control the operation of the network interface 350. The control processor 318 may correlate the operation of one component with the operation of another component. For example, the control processor 318 may determine via the environmental sensors 312 that the network vehicle 300 may be traveling through mud and may then initiate the steering mechanism 306 to control the ground movement device 380 to steer and move to another location. According to some aspects, the above examples (as well as other examples) may be performed in response to the control processor 318 receiving an instruction from a cloud-based resource (e.g., controlled by the local office 103 or other entity). According to some aspects, an entity, such as the cloud-based source, the local office 103, or other entity may control the movement of the network vehicle 300 in a fashion similar to a remote control drone vehicle or remote control car.

The network vehicle 300 may comprise a power source 320 that may provide power to the network vehicle 300 (e.g., to one or more components of the network vehicle 300). For example, the power source 320 may be a battery, such as a rechargeable battery, an electrochemical battery, or a solar battery. According to some aspects, the power source 320 may be a hydroelectric power source, a wind/turbine power source, a biomass power source, a nuclear power source, and the like.

While the network vehicle 300 may include all of the above features, one of skill in the art would appreciate that the network vehicle 300 may include fewer or more than the above described features. One of skill in the art would also appreciate that the network vehicle 300 may include duplicate features or components, such as the features or components described herein.

Figure 4A:
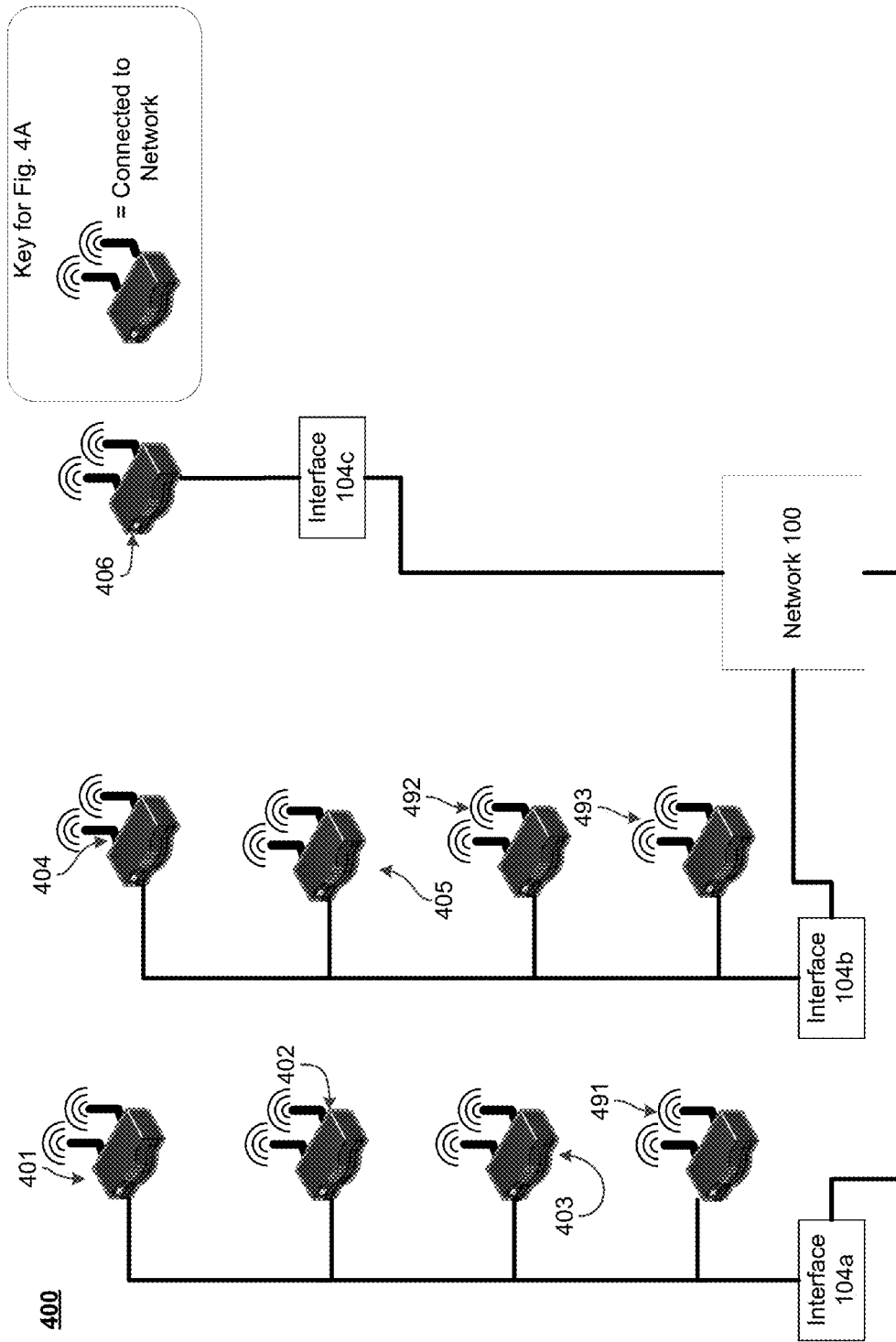
FIG. 4A illustrates an example network with full connectivity in accordance with aspects of the present disclosure.

FIG. 4A illustrates an example network 400 with full connectivity in accordance with one or more disclosed features described herein. Network system 400 may be similar to, the same as, or comprise the network 100 shown in FIG. 1. Network system 400 may include the access nodes or points 401-06 and 491-93. Network system 400 may include network interfaces 104a, 104b, and 104c, which may be connected to local office 103 or another entity. Each access point 401-06 and 491-93 may be the access points 140 shown in FIG. 1, and may be in, connected to, or a part of the network 100, or a different network. The access points 401-06 and 491-93 may form part of a wired network and provide access to a communication network (e.g., network 100). The access points 401-06 and 491-93 may also form part of a wireless local area network (WLAN) and provide access to a communication network. The access points 401-06 and 491-93 may be wireless access points (e.g., Wi-Fi-enabled devices) in accordance with wireless protocol (e.g., IEEE 802.11 standard). The access points 401-06 and 491-93 may comprise a wireless coverage range, which may be the wireless signals or broadcast beacons emitting from the access points 401-06 and 491-93. The interfaces 104a-104c may be termination stations. More specifically, the interfaces 104a-104c may be termination systems (TS), which may be computing devices configured to manage communications of information between the access points 401-06 and 491-93 and backend devices such as the servers 105-08 of the local office 103 (or other entity), a connection to the network 100, or to some other network/device.

Figure 4B:
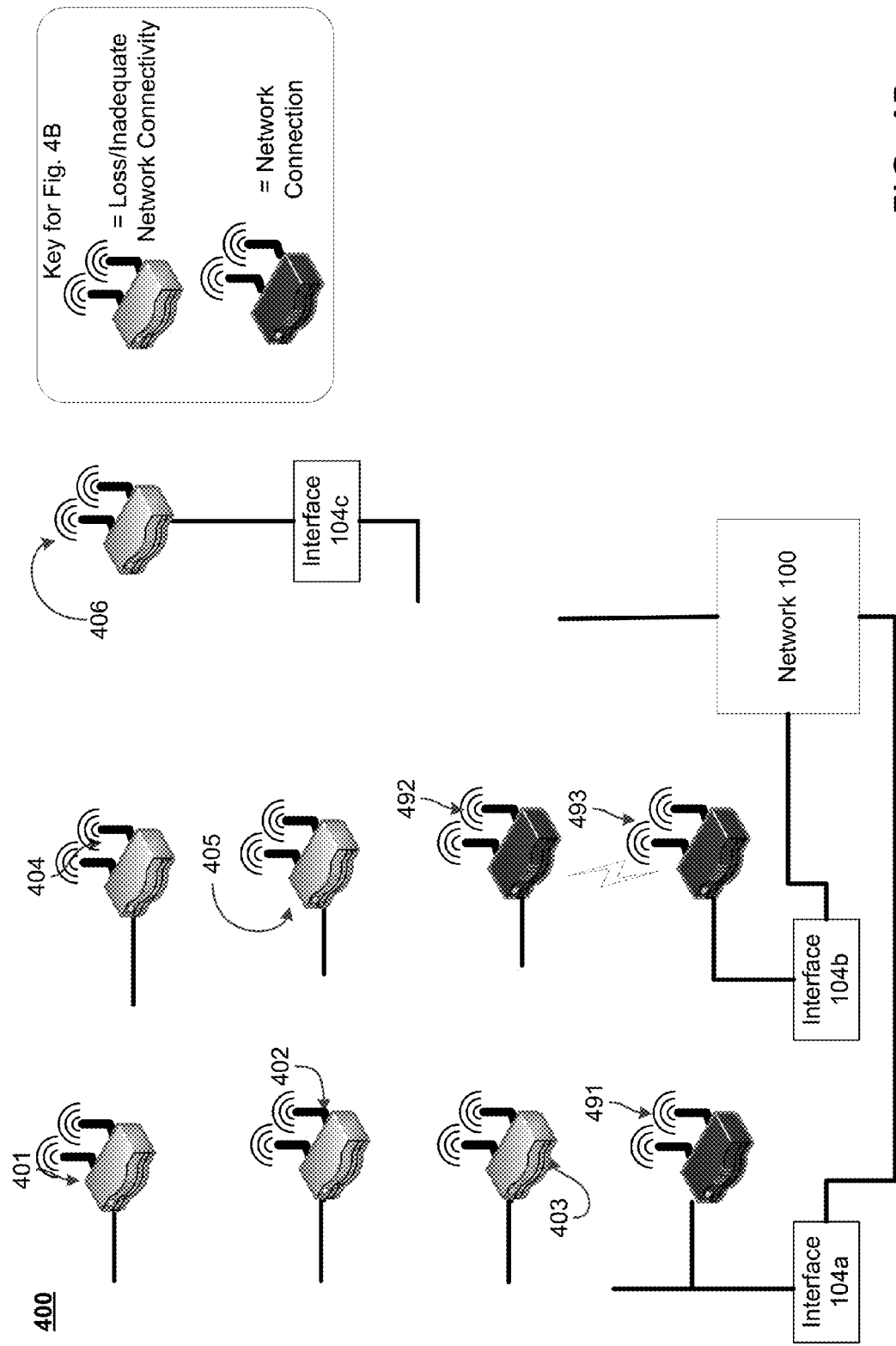
FIG. 4B illustrates an example network with lost connections in accordance with aspects of the present disclosure.

FIG. 4B illustrates an example network 400 with lost connections in accordance with one or more disclosed features described herein. FIG. 4B may illustrate the network system 400 after a failure, a loss, or a decrease in network connectivity of all or a portion of network system 400, which may result in one more of the access points 401-06 and 491-93 losing network connectivity with the local office 103 or other entity (e.g., network 100) via their respective distribution network, such as interfaces 104a-104c or a line. In the example illustrated in FIG. 4B, access points 401-06 and 492 have lost their primary connection (e.g., the wired line connection). In some instances, the decrease in network connectivity or service disruption may be caused by a natural disaster (e.g., flood, hurricane, tornado, etc.), an accident, an attack, construction, or any other event. In some cases, the local office 103 or other entity (e.g., via the mesh server 108) may initiate a process to establish a wireless network between the multiple access points 401-06 and 491-93 in order to reestablish service to all or a portion of the access points 401-06 and 491-93. In such situations, one or more of the access points 401-06 and 491-93 may have overlapping wireless coverage areas enabling one or more of the access points 401-06 and 491-93 to communicate wirelessly (e.g., via Wi-Fi or other wireless protocols) with other access points. For example, after the access point 492 loses connectivity to the local office 103 or another entity due to the disconnection with the interface 104b (shown by the broken wire/connection), the local office 103 or other entity (e.g., via the mesh server 108) may send an instruction to the access point 493 (e.g., an access point that may be still connected to the local office 103 or another entity and located in proximity the access point 401) to connect (e.g., wirelessly) to the access point 492 (as illustrated in FIG. 4B by the lightning bolt between access point 492 and access point 493). The access point 493 may then provide, to access point 492, access to the network associated with the local office 103 or another entity.

In some cases, the access points 401-06 and 491-93 may initiate a process to establish a wireless network between the access points 401-06 and 491-93. For example, if access point 492 loses connectivity to the local office 103 or another entity, access point 492 may seek out other access points (e.g., access point 493) in proximity to access point 492 to connect with and provide network access to access point 492. For example, if access point 492 is located at a first user's house, then after access point 492 loses network connectivity to the local office 103 or other entity (e.g., loses the wired connection to interface 104b), the access point 493 may access the network associated with the local office 103 or other entity via connecting to a neighbor's access point 493 or via a Wi-Fi hotspot access point associated with or provided by the local office 103 or other entity.

Figure 4C:
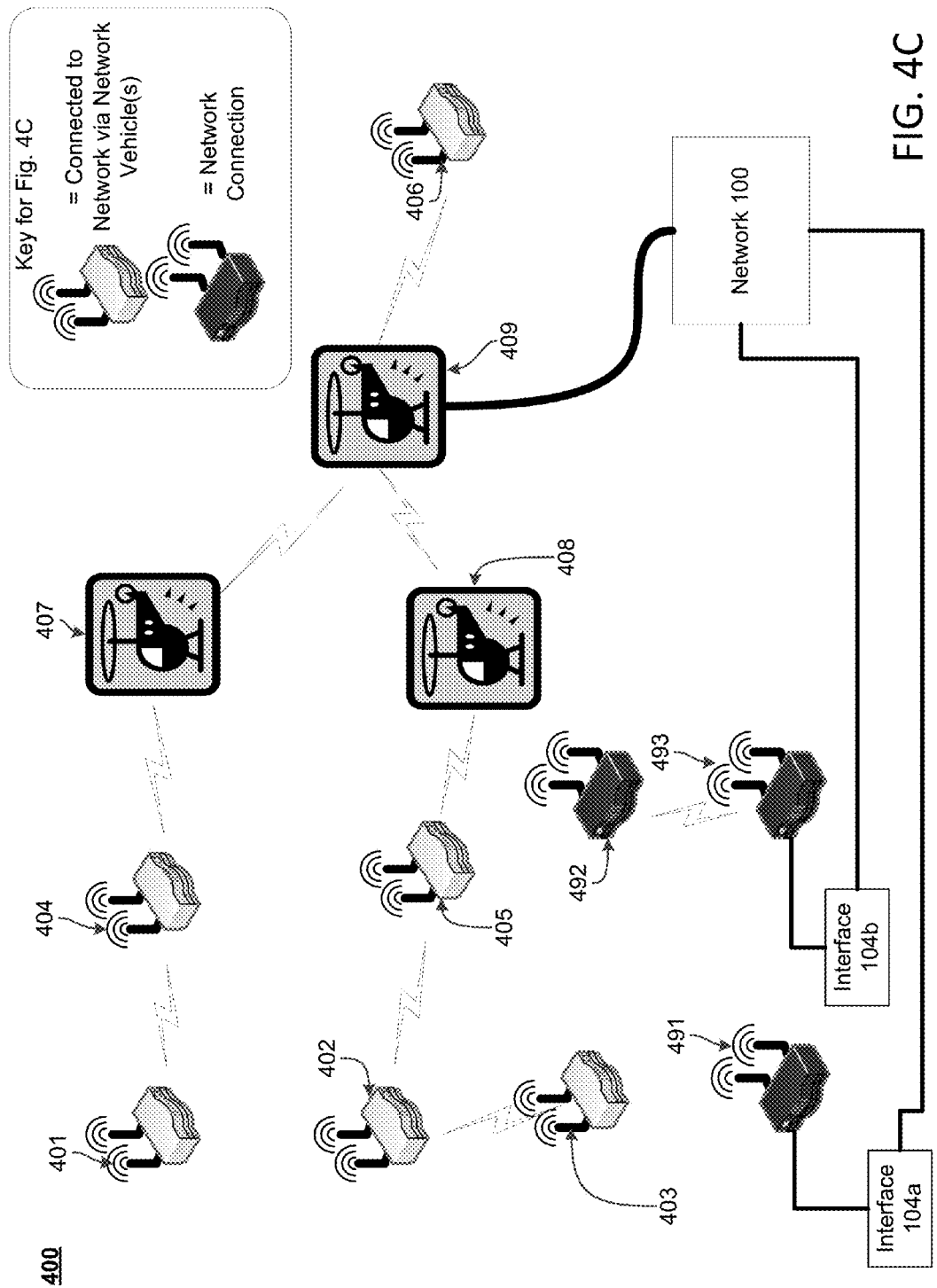
FIG. 4C illustrates an example network with network vehicles in accordance with aspects of the present disclosure.

FIG. 4C illustrates an example network 400 with network vehicles in accordance with one or more disclosed features described herein. The network system 400 illustrated in FIG. 4C may include network vehicles 407-09, which may be the same as the network vehicle 300 illustrated in FIG. 3. FIG. 4C may illustrate the network system 400 after a failure, a loss, or a decrease in network connectivity of all or a portion of network system 400 that results in one more of the access points 401-06 and 491-93 losing network connectivity with the local office 103 or other entity via their respective distribution network, such as interfaces 104a or 104b, or a line. In one example, the network failure may be widespread, such that an access point 401-06 or 491-93 that has lost connectivity might not be able to connect to the local office 103 or other entity by connecting to another access point 401-06 or 491-93. The local office 103 or other entity may detect or determine that there is a network failure, and may initiate or deploy the one or more network vehicles 407-09 to a geographical location near the network failure. In such situations, the one or more network vehicles 407-09 may connect to an access point 401-06 that has lost network connectivity, and the network vehicle may provide, to this access point, access to network resources.

The network vehicles 407-09 may each be the network vehicle 300 shown in FIG. 3. The network vehicles 407-09 may be in, connected to, or a part of the network 100, or a different network. The network vehicles 407-09 may provide to other devices (e.g., access points 401-06, other network vehicles, etc.) access to network resources associated with the local office 103 or other entity (e.g., via a wireless protocol). Each of the network vehicles 407-09 may comprise a wireless coverage range, which may be the wireless signal emitting from the network vehicles 407-09. While three network vehicles and six access points are illustrated in FIG. 4C, any number of network vehicles and access points may be used in accordance with one or more features described herein.

Each access point 401-06 may serve, or otherwise provide network connectivity to, a particular area or location. For example, the access points 401-06 may serve devices within each devices' respective wireless range. The coverage area for each wireless range may vary. For example, the coverage range for access point 401 may cover an average radius of 25 feet, while the coverage range for access point 402 may cover an average radius of 45 feet. According to some aspects, devices that are located within a coverage range of an access point may connect to the access point to access network resources provided via (or otherwise associated with) the access point. For example, a wireless device 116 located within the coverage range of access point 401 may connect to the access point 401, which may then provide access to resources associated with the line 101a (e.g., internet access, email, content, etc.).

In order to facilitate discovery of a particular device (e.g., an access point, network vehicle, other wireless devices) by access points 401-06, network vehicles (e.g., network vehicles 407-409), other wireless devices (e.g., tablet, computer, cell phone, and the like), or the particular access point (e.g., the access point 401) may broadcast network information (e.g., via a beacon signal or message). The beacon signal may include information such as a network identifier (e.g., the public or private SSID, which may have been provided by a service provider), network mode, and a device identifier such as a medium access control (MAC) address of the particular device. The beacon signal may be an emergency beacon signal that may indicate that the device (e.g., an access point, network vehicles, and the like) may be a distressed device that may have little to no connectivity to a network (e.g., line 101) or may indicate that the distressed device may have lost connectivity to the network. For example, the access points 401-06 may use methods 700 and 800, described below, to indicate that a network connection has been lost. The access points 401-06 and network vehicles 407-09 may broadcast the beacon signals on the same or different communication channels, such as different frequency channels. These channels may be channels defined by the IEEE 802.11 standards. In some aspects, other protocols may be used, such as cellular protocols (3G, 4G, LTE, etc.), satellite, DSL, light/fiber optic, Ethernet, and the like.

According to some aspects, the local office 103 or another entity (e.g., the mesh server 108) may receive, from one of the access points 401-06 or 491-93, an indication that the access point detected another device (such as another access point, network vehicle, or wireless device). According to some aspects, the local office 103 or other entity (via the mesh server 108) may receive from one of the access points 401-06 or 491-93 an indication that the access point 401-06 or 491-93 did not detect another device (such as another access point, network vehicle, or wireless device). Based on these indications, the local office 103 or other entity may send instructions to other devices (e.g., other access points, wireless devices, network vehicles 407-09, etc.) that may instruct those devices to perform some action. For example, the local office 103 or other entity may instruct the network vehicle 407 to move from a first location that is proximate to access point 401 or within the wireless coverage range of access point 401 to a second location in proximity to the access point 404 or within the wireless coverage range of access point 404.

According to some aspects, a technician or a computing device associated with the local office 103 or other entity may detect a beacon signal broadcasted by an access point. For example, the technician may walk around a premises and detect beacon signals with a signal detector (e.g., a device configured to detect broadcasted beacons). In another example, a mobile vehicle (e.g., a truck, mobile robot, etc.) may search or detect broadcasted beacons or related SSID information. For example, as the mobile vehicle travels within an effective wireless range of one of the access points 401-406, the mobile vehicle may receive broadcast network information from one or more of the access points 401-406 and determine associated SSID information.

According to some aspects, the network failure may be more widespread, such that an access point that has lost connectivity (e.g., access point 401) might not be able to connect to the local office 103 or another entity via access points 401-06 or 491-93. The local office 103 or other entity may detect or determine that there may be a network failure, and may initiate or deploy the one or more network vehicles 407-09 to the geographical location near the network failure. In such situations, the one or more network vehicles 407-09 may connect to an access point 401-06 that has lost network connectivity and provide, to this access point 401-06, access to network resources.

According to some aspects, the network vehicles 407-09 may detect that a particular access point (e.g., access points 401-06) has lost network connectivity. For example, after the network vehicle 407 is deployed to an area associated with a network outage, the network vehicle 407 may search out access points without access to network resources. An access point (e.g., access points 401-06) may broadcast a beacon signal or message even though the access point might not be connected to a network or to the local office 103 or other entity. The network vehicle 407 may have a wireless coverage range and may actively search for a beacon signal, transmitted by an access point 401-06, by determining whether the beacon signal is within the coverage range of the network vehicle 407. For example, the network vehicle 407 may detect the beacon signal of access point 404 when the network vehicle 407 is within wireless range of the beacon signal. The network vehicle 407 may use a wireless interface 310 or other protocols to detect that an access point does not have access to network resources. In a first example, the network vehicle 407 may fail to detect a beacon signal transmitted from an access point when the network vehicle 407 is in proximity to the access point. In a second example, the network vehicle 407 may detect the beacon signal, but the beacon signal may fail to associate with a network. In a third example, the detected beacon signal may successfully associate with a network, but the associated access point may fail to obtain an IP assignment. In a fourth example, the access point may obtain an IP assignment, but the access point may fail to receive test data from the network.

One of the access points 401-06 may broadcast the access point's network connectivity state to one of the network vehicles 407-09 via the beacon. According to some aspects, the access point may broadcast, in a beacon signal, that the access point's network backhaul or backbone connection is down (or otherwise not properly connected), and that the access point may require a network backhaul or backbone connection to the network. For example, the access points 401-06 may use methods 700 and 800, described below, to indicate that a network connection has been lost. In such situations, the broadcasted beacon signal may be a separate broadcast than a beacon signal configured to connect to another device (as discussed above). According to some aspects, the access point may indicate or advertise via these beacon signals that assistance is required by modifying an associated SSID name. For example, the access point may modify the original "[SSID Name]" value to an altered value of "[SSID Name]_OutOfService" to indicate to the network vehicle 407 that the access point has lost network connectivity. According to some aspects, the access point may use 802.11u Access Network Query Protocol (ANQP) query element(s) to indicate that assistance is requested. For example, a passpoint access point may use an ANQP query element. The ANQP service may indicate, in an ANQP capabilities list, that assistance is required or requested. The network vehicle 407 may request access to the ANCP capabilities list. For example, the access point may create an ANQP query element as "Standard ANQP Element [WAN Metrics–WAN Info–Link Status]=Down" to indicate that the access point is out of service or not connected to a network. In another example, the access point may create a custom ANQP element (e.g., vendor-specific) that may be defined so as to be understood by the access point and the network vehicle 407. Use of this custom ANQP element may provide less visibility to other Wi-Fi-configured devices that may be inspecting the beacon, and therefore may provide for increased security.

According to some aspects, a network vehicle 409 may scan for these beacon advertisements (discussed above) transmitted by the access point 406, and after detecting the beacon signals, the network vehicle 409 may authenticate the access point 406 and may establish a secure link to the access point 406. According to some aspects, the network vehicle 409 may be directly connected to network resources associated with the local office 103 or other entity, such as being directly connected to the network's backhaul or backbone. For example, the network vehicle 409 might be connected to the network resources associated with the local office 103 without connecting to another network vehicle or another access point.

According to some aspects, after a network vehicle 407 may have detected a beacon advertisement transmitted by the access point 404 and authenticated and established a link with the access point 404, the network vehicle 407 may need to connect to another device (e.g., another access point, another network vehicle, etc.) before providing to the access point 404 network resources associated with the local office 103 or other entity. The route to access the network backhaul may pass through multiple network vehicles until a direct connection may be made to the network. For example, after the access point 404 connects with the network vehicle 407, the network vehicle 407 may connect (e.g., via a wireless protocol) with the network vehicle 409. The network vehicle 409 may then directly connect to the network associated with the local office 103 or other entity. Information may then be transmitted between the access point 404, the network vehicle 407, the network vehicle 409 and the network, thus establishing a network connection to the access point 404. According to some aspects, an access point may connect to one or more other devices (e.g., other access points or network vehicles) to gain network connectivity. For example, as illustrated in FIG. 4C, access point 403 may connect to access point 402, access point 402 may connect to access point 405, access point 405 may connect to network vehicle 408, network vehicle 408 may connect to network vehicle 409, and network vehicle 409 may connect to a network associated with the local office 103.

According to some aspects, a reporting device may be a device that detects and reports (e.g., to another device, the mesh server 108, etc.) a beacon transmitted by a device that might not be connected to the network. For example, referring to FIG. 4C, the network vehicle 409 may detect beacons transmitted by the access point 406 and the network vehicles 407 and 408. The network vehicle 409 may then send a message to the local office 103 or another entity indicating that beacons have been detected from the access point 406 and the network vehicles 407 and 408. In such a case, the network vehicle 409 may be referred to as a reporting device. In another example, the access point 404 may be a reporting device if the access point 404 detects and reports the beacon of access point 401 to the network vehicle 407.

According to some aspects, a forwarding device may be a device that forwards messages indicating a detected beacon. For example, referring to FIG. 4C, the access point 404 may be a reporting device if the access point 404 detects and reports the beacon of access point 401 to the network vehicle 407. The network vehicle 407 may then forward this information (e.g., the detection of the beacon of access point 401 by access point 404) to the network vehicle 409. According to some aspects, a device may be a forwarding device and a reporting device.

In one implementation, the connection between the access point 404 and the network vehicle 407 and the connection between the access point 404 and the network vehicles 408 may be of a first type of connection. For example, the first type of connection may be Wi-Fi due to an amount of data that may need to be transmitted to the access points 404 and 405 which may be due to the access points 404 and 405 having to provide network access to more downstream devices (e.g., access points 401, 402, and 403). In this implementation, the connection between the access point 402 and the access point 403 may be of a second type. For example, the second type of connection may be cellular due to a distance between the access points 402 and 403. In this implementation, a third connection may be different than the first and second connections. For example, the third connection may be a satellite connection due to obstructions between the devices. While the above examples may use specific types of connections, any type of connection may be used in accordance with the features disclosed herein.

Figure 4D:
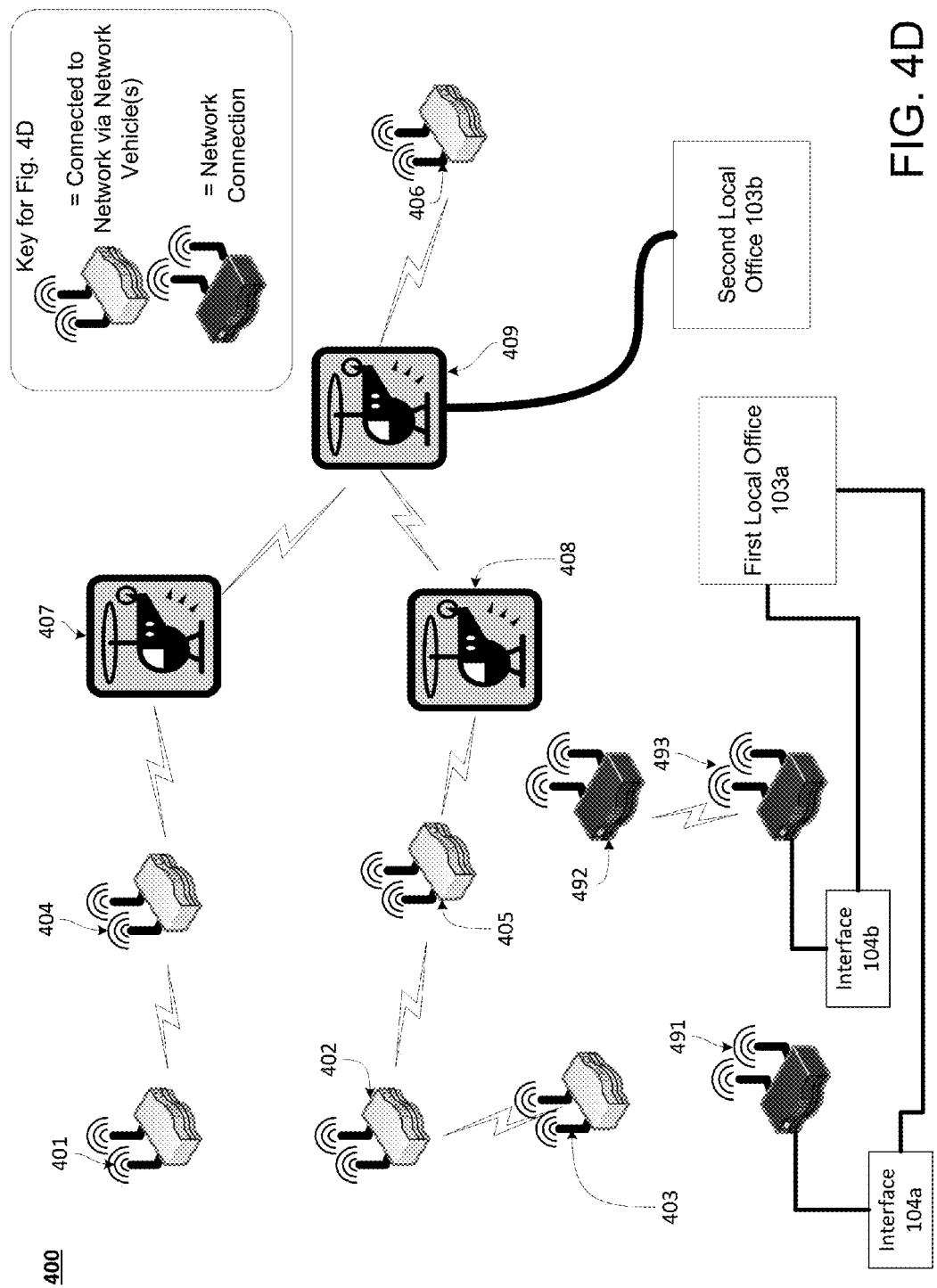
FIG. 4D illustrates an example network with multiple local offices in accordance with aspects of the present disclosure.

FIG. 4D illustrates an example network 400 with multiple local offices in accordance with one or more disclosed features described herein. The network system 400 illustrated in FIG. 4D may include network vehicles 407, 408, and 409, which may be network vehicles 300, as illustrated in FIG. 3. FIG. 4C may illustrate the network system 400 after a failure, a loss, or a decrease in network connectivity of all or a portion of network system 400 that may result in one more of the access points 401-06 and 491-93 losing network connectivity with the first local office 103a (or a network associated therewith) via their respective distribution network, such as interfaces 104a-104c or a line. The first local office 103a or other entity may detect or determine that there may be a network failure, and may initiate or deploy the one or more network vehicles 407-409 to the geographical location near the network failure. In such situations, the one or more network vehicles 407-09 may connect to an access point that has lost network connectivity (e.g., the access points 401-06) and may provide, to this access point, access to network resources. As shown in FIG. 4D, the network vehicles 407-09 may provide a connection to a second local office 103b (e.g., different than the first local office 103a) or a network associated therewith. For example, the local office 103b may be closer to (or otherwise easier to access by) the network vehicles 407-09 and may provide for a more optimal network connection. According to some aspects, the network vehicles 407-09 may connect to the second local office 103b due to bandwidth constraints on a network associated with the first local office 103 (e.g., due to network saturation). According to some aspects, one or more of the network vehicles 407-09 may connect to the first local office 103a, and one or more of the network vehicles 407-09 (e.g., different network vehicles than the ones connected to the first local office 103a) may connect to the second local office 103b.

According to some aspects, the first local office 103a may be owned, controlled, operated, or otherwise associated with a first service provider (e.g., a provider of cable, cellular, internet, other content, etc.) and the second local office 103b may be owned, controlled, operated, or otherwise associated with a second service provider (e.g., different than the first service provider). In such a case, the access points 401-06 may be granted access to the network associated with the second service provider, even if the access points 401-06 might not have been previously granted access to the network associated with the second service provider (e.g., having no account or affiliation with the second service provider). Such a situation may occur when the first service provider might not be able to repair the network infrastructure (e.g., in a timely manner). Aspects disclosed herein may be used with any number of local offices or service providers.

Figure 5:
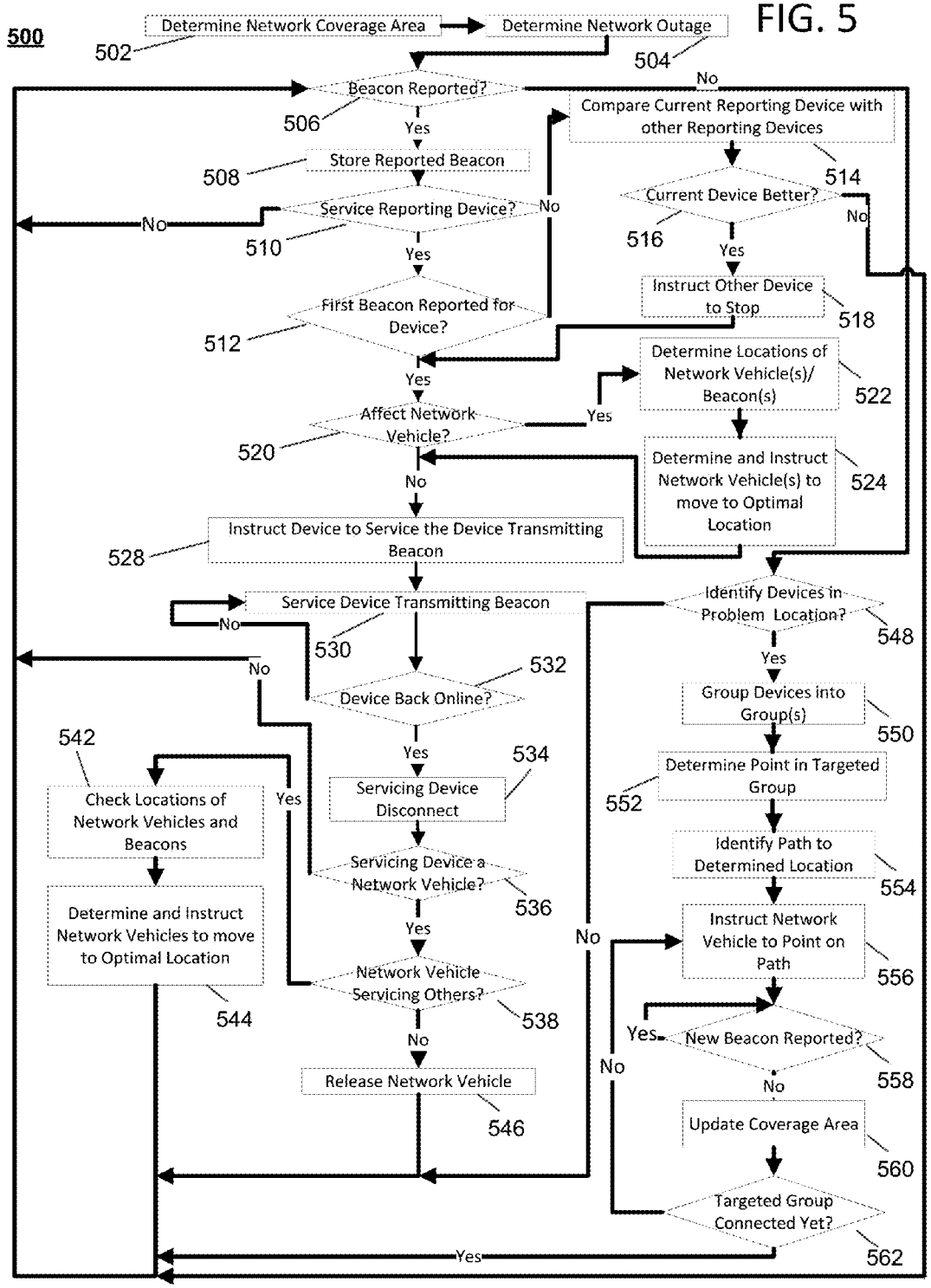
FIG. 5 is a flow diagram of a method for maintaining network connectivity in accordance with aspects of the present disclosure.

FIG. 5 is an exemplary flow diagram illustrating an example process, or a collection of processes, 500, in accordance with one or more disclosed features described herein. In one or more embodiments, the process illustrated in FIG. 5 or one or more steps thereof may be performed by one or more computing devices or entities. For example, portions of the process 500 may be performed by components of network 100, the computing device 200, components of or associated with the local office 103 or other entity, one or more content providers, the access points 401-06 and 491-93, or the network vehicles 407-09. In other embodiments, the process illustrated in FIG. 5 or one or more steps thereof may be embodied in computer-executable instructions that are stored in a computer-readable medium, such as a non-transitory computer-readable memory. The steps in this flow diagram need not all be performed in the order specified and some steps may be omitted or changed in order.

In one example, process 500 (and related descriptions disclosed herein) may address aspects dealing with situations in which the network vehicles 407-09 or the access points 401-06 and 491-93 might not be initially connected to the network (e.g., network 100 or the network associated with the local office 103 or other entity) after detecting distressed devices and may need to establish a wireless connection via devices connected to the network in order to access or connect to the network. For example, with respect to FIG. 4C, network vehicle 407 may be a roving network vehicle, and, after establishing a connection with an access point 404, the network vehicle 407 might not be connected to the network associated with the local office 103 or other entity. Therefore, the roving network vehicle 407 may need to connect to a device (e.g., another network vehicle or access point) that may have access to network resources (e.g., resources coming from network 100 or the network associated with the local office 103 or other entity). For example, the network vehicle 407 may connect to the network vehicle 409, and the network vehicle 409 may be connected to or otherwise have access to the network associated with the local office 103 or other entity. In addition or alternatively, the network vehicle 407 or 409 may connect to an access point (such as a Wi-Fi hotspot having access to the network, etc.) which may provide access to network resources. Alternatively or additionally, an access point 401 may connect to access point 404, which may connect to the network vehicle 407, which may connect to a Wi-Fi hotspot, which may connect to the network vehicle 409, which may connect to the network associated with the local office 103 or other entity. For example, the network vehicle 409 may be an aerostat that may connect wirelessly to the network 100 or to the local office 103. Accordingly, various combinations of devices may form a mesh network or chain to provide devices with access to network resources.

In another example, process 500 (and related descriptions disclosed herein) may address aspects dealing with situations in which the network vehicles 407-09 or the access points 401-06 and 491-93 may be initially connected to the network (e.g., the network associated with the local office 103 or other entity) after detecting distressed devices and might not need to establish a wireless connection via devices connected to the network in order to access or connect to the network. An example of this may be illustrated by the network vehicle 409 shown in FIG. 4C, in which the network vehicle 409 or the access point 493 may have a connection (e.g., direct or indirect) to a network or to the local office 103 or other entity.

In the example provided, the process 500 may begin with step 502, in which the local office 103 or other entity may determine a network coverage area. According to some aspects, the local office 103 or other entity (e.g., via the mesh server 108) may generate a wireless network coverage map, which may include a geographical map of a particular area (e.g., a neighborhood, retail center, business district, commercial or residential buildings, and the like). The map may include the geographic locations of access points 401-06 and 491-93, which the mesh server 108 may base on location information (e.g., latitude and longitude, GPS information, triangulation information, associated street address, and the like). The mesh server 108 may determine the designed/manufacturer-specified wireless range of each access points 401-06 by retrieving range information from a database of the local office 103 or from another entity. For example, a first device type (e.g., access point 401) may have an effective range of a 20 foot radius, while a second device type (e.g., access point 402) may have an effective range of a 40 foot radius. The mesh server 108 may plot or otherwise generate a map of an estimated wireless coverage range for each access point 401-02 based on the designed wireless range of each device type. In one implementation, at step 502, an expected coverage area of the network may be determined. In this implementation, one or more devices within the expected coverage area that are associated with a loss of connectivity to the network may be identified.

At step 504, the local office 103 or other entity (e.g., via the mesh server 108) may determine that there is a network outage associated with the determined network coverage area. According to some aspects, a failure, decrease, or a loss in network connectivity of all or a portion of network system 400 may result in one more of the access points 401-06 losing network connectivity with the local office 103 or other entity via their respective distribution network (e.g., a termination station or a line). In some instances, the failure may be caused by a natural disaster (e.g., flood, hurricane, tornado, etc.), an accident, an attack, construction, or any other event.

According to some aspects, at step 504, the local office 103 or other entity (e.g., via the mesh server 108) may develop a disaster management plan. For example, the mesh server 108 may determine the scope of a disaster by analyzing which access points have lost network connectivity through their assigned distribution network (e.g., Hybrid fiber-coaxial lines). The mesh server 108 may identify which access points are still connected to the network by sending requests (e.g., pings) to verify network connectivity to known access points (e.g., access points that may be registered with or otherwise associated with the local office 103 or other entity). If the mesh server 108 does not receive a response to this request from an access point, then the mesh server 108 may determine that that access point has lost connectivity to the network. According to some aspects, the mesh server 108 may wait a predetermined period of time before identifying an access point as being disconnected from the network. For example, a user may have disconnected the user's modem from a wired connection. In such a case, the modem might not immediately respond to a ping transmitted by the mesh server 108. The mesh server 108 may then transmit a subsequent ping (or pings), such as after a predetermined period of time (e.g., 10 minutes), to determine if the modem has reconnected to the network.

According to some aspects, at step 504, a user associated with an access point that has lost network connectivity may inform the local office 103 or other entity of the loss or decrease of network connectivity. For example, a customer may call a service provider to inform the service provider that the customer's modem is not providing access to network resources for the customer's devices (e.g., set-top box, smartphone, computer, etc.).

According to some aspects, at step 504, the mesh server 108 may receive reports transmitted by network connected devices (e.g., access points, network vehicles, etc.) located adjacent to (e.g., within a wireless range) a non-connected/distressed device (e.g., access points, network vehicles, etc.). These reports may indicate whether the network connected device detected a beacon signal (e.g., emergency beacon) transmitted by a non-connected device. For example, referring to FIG. 4C, after a wire connecting the access point 492 to the interface 104b may have been cut or damaged, the access point 492 may initially broadcast an emergency beacon indicating that the access point 492 has lost connectivity to the network. The access point 493 may be located close enough to the access point 493, such that the access point 493 may detect the emergency beacon (e.g., the emergency beacon being detected within the wireless range of access point 493) and may send, to the mesh server 108, a message indicating that an emergency beacon has been detected by the access point 493.

According to some aspects, at step 504, the mesh server 108 may update a generated network coverage map to show which access points have lost network connectivity over their assigned distribution network. The mesh server 108 may transmit to the network vehicles 407-09 the generated coverage map showing network outages. Alternatively or additionally, the network vehicles 407-09 may download the generated coverage map showing network outages.

According to some aspects, at step 504, the local office 103 or other entity (e.g., via the mesh server 108 or a cloud-based resource) may communicate with network vehicles, access points, and other devices. For example, the local office 103 or other entity via the mesh server 108 may send an instruction to the network vehicles 407-09 to initiate or deploy to a geographical area associated with a network outage. For example, the local office 103 or other entity may instruct the network vehicle 407 to move from a first location that is proximate to access point 401 or within coverage range of access point 401, or to a second location in proximity to the access point 404 or within coverage range of access point 404. According to some aspects, the network vehicles 407-09 may be self-deploying devices or autonomous devices that can be programmed to travel to a destination. According to some aspects, the network vehicles 407-09 may download a coverage map that shows or provides the expected coverage area provided by access points in a network outage area. According to some aspects, the network vehicles 407-09 may download a coverage map showing a geographical area of a network outage.

According to some aspects, at step 504, the network vehicles 407-09 may self-deploy or self-initiate (e.g., roving) and use the GPS 308 to determine the geographical coordinates of network vehicles 407-09. According to some aspects, the network vehicles 407-09 may be roving vehicles that may periodically or continuously scout for devices broadcasting an emergency beacon. The network vehicles 407-09 may move to the network outage area using one or more transportation devices configured to move the network vehicles 407-09. According to some aspects, a network vehicle, such as an air-based network vehicle, may scout an area to identify coordinates, devices, etc. associated or within that area, and relay information, such as location information, back to another network vehicle, such as a ground-based network vehicle. In such a situation, the ground-based network vehicle may then use that received information to deploy to a particular location. Such a situation may occur when the network vehicles are optimizing their locations or placement.

At step 506, the local office 103 or other entity (e.g., via the mesh server 108) may determine whether a beacon has been reported by a network connected device (e.g., from a network connected access point, network vehicle, wireless hotspot, etc.). According to some aspects, the access points 401-06 and 491-93 and network vehicles 407-09 may transmit the location information to a cloud-based source, the local office 103, or another entity. The local office 103 or other entity may receive information from the network vehicles 407-09 and access points 401-06 and 491-93 that may include an identification or determination of devices in an area associated with a network outage that have lost connectivity to a network (e.g., network associated with the local office 103 or other entity). For example, an adjacent access point may be an access point having an overlapping wireless coverage area. The access points (or other devices) that have lost connectivity (e.g., the access points 401-06) may broadcast a beacon indicating that they have lost network connectivity, and the connected access points may detect this beacon and connect to these non-connected access points. For example, the access points may use methods 700 or 800, described below, to indicate that they have lost network connectivity. The mesh server 108 may then determine (via the steps below) whether the connected device (e.g., the reporting device) may then provide to the non-connected device access to network resources. According to some aspects, network vehicles and access points may determine which devices in the network outage area may have access to network resources or which devices in the network outage area might not have access to network resources by detecting at least a threshold amount of a signal strength associated with the a distressed device's beacon signal.

If it is determined that a beacon has not been reported, the process 500 may continue to step 548, which will be described below in more detail. If it is determined that a beacon has been reported (e.g., detected), the process 500 may continue to step 508.

At step 508, the process 500 may enter into a process loop that may be performed for each beacon reported to the local office 103. At step 508, the local office 103 or other entity (e.g., via the mesh server 108) may store information associated with a reported beacon. According to some aspects, the information transmitted to the mesh server 108 may include information regarding detected beacons. For example, a non-connected access point may broadcast in a beacon signal that the access point's network backhaul or backbone connection is down (or otherwise not properly connected), and that the access point may require a network backhaul or backbone connection to the network. In such situations, this broadcasted beacon signal may be a separate broadcast than a beacon signal configured to connect to another device (as discussed above). The reporting device may forward any of this information to the mesh server 108.

The received beacon signal may include information such as a network identifier (e.g., the public or private SSID, which may have been provided by a service provider), network mode, and a device identifier such as a medium access control (MAC) address of the particular access point (e.g., the access points 401-06). According to some aspects, the access point may indicate or advertise via these beacon signals that assistance is required by modifying an associated SSID name. For example, the access point may modify the original "[SSID Name]" value to an altered value of "[SSID Name]_OutOfService" to indicate to the network vehicle 407 that the access point may have lost network connectivity. According to some aspects, the access point may use 802.11u Access Network Query Protocol (ANQP) query element(s) to indicate that assistance is required. Such situations may happen when the access point may be a passpoint access point. The ANQP service may indicate in an ANQP capabilities list that assistance is required, and the network vehicle 407 can request access to this list. For example, the access point may create an ANQP query element as "Standard ANQP Element [WAN Metrics–WAN Info–Link Status]=Down" to indicate that the access point is out of service or not connected to a network. In another example, the access point may create a custom ANQP element (e.g., vendor-specific) that may be defined to be understood only by the access point and the network vehicle 407. Use of this custom ANQP element may provide less visibility to other Wi-Fi-configured devices that may be inspecting the beacon, and therefore may provide for increased security. The reporting device may forward any of this information to the mesh server 108. For example, the access points 401-06 may use methods 700 and 800, described below, to indicate that a network connection has been lost.

According to some aspects, the information (e.g., a message or communication) transmitted to the mesh server 108 may include information regarding the load (e.g., distance between devices, the capacity, bandwidth, limitations, type of device, type of data being transmitted, type of connection, etc.) the reporting device (or any other device detected by or connected to the forwarding device) may be using or handling.

According to some aspects, the message transmitted by the reporting device (e.g., the network connected device that detected the beacon) may include information such as a location of the reporting device (e.g., GPS, physical address, coordinates, etc.). According to some aspects, the network vehicles 407-09 may generate a map or chart comprising the identified or detected devices in or near (or otherwise associated with) the network outage area. The network vehicles 407-09 may identify the GPS coordinates (e.g., via the GPS 308) for each device's location, and may include this in the map. The local office 103 or other entity may generate a map based on this location information. According to some aspects, The mesh server 108 may determine if there has been a theft of service based on, for example, a comparison of where an access node is determined to be approximately located (e.g., based on information received from a network vehicle) and the location of the access node stored in a database of the local office 103. According to some aspects, the local office 103 may determine which type of mesh network may work the best for the devices detected in the area. For example, the local office 103 may instruct the network vehicles to initiate a combination of types of wireless connections. For example, there may be a combination of Bluetooth and cellular connections, such as for a particular type of data (e.g., email, voice, etc.), and there may be a combination of Wi-Fi or WiMax connections for other data (e.g., media content, internet content, etc.).

At step 510, the mesh server 108 may determine whether the reporting device (e.g., device that detected the beacon) may be able to service (e.g., provide network connectivity to) the distressed access point. The mesh server 108 may use information received from the beacon reports (along with other information) for this determination. In one example, the mesh server 108 may determine that a reporting device might not be able to service a distressed device if the reporting device's load or capacity may be above a threshold level (e.g., can service no more than 3 devices, might not be able to go above a bandwidth level, etc.). In another example, the reporting device might not provide a strong enough signal strength to adequately support network connectivity to a distressed device (e.g., due to distance, obstacles, connection problems/properties, etc.). There may be other reasons why a reporting device might not be able to service a distressed access point. For example, the mesh server 108 (or associated entity) may be aware of malicious attempts (such as in a particular location associated with the reporting device) to access the network or network associated devices. The mesh server 108 may determine that a reporting device may be prone to malicious acidity, and may determine that such a reporting device might not be able to service a distressed device. In another example, a user associated with a reporting device might have indicated to the local office 103 or other entity that the user might not want network traffic routed through the user's device (e.g., due to privacy or other reasons). In such a case, the mesh server might determine that such a reporting device might not be able to service a distressed device. In another example, the distressed device might be associated with a user or account that might have not fulfilled a task, requirement, duty, etc. provided by the local office 103 or other entity. For example, an account associated with a distressed device might be associated with a default bill payment for a service provider. In such a case, the local office 103 or other entity might not want to provide network connectivity to the distressed device, and may determine that a reporting device might not be able to service a distressed device. If it is determined that the reporting device might not be able to service the distressed access point, the process 500 may return to step 506, in which the local office 103 may determine whether a beacon has been detected and reported (e.g., from another reporting device). If it is determined that the reporting device may be able to service the distressed device, the process 500 may continue to step 512.

At step 512, the mesh server 108 may determine whether the reported beacon may be the first beacon reported for this distressed device. According to some aspects, a plurality of devices may detect a beacon transmitted by a distressed access point, and each of those devices may report that beacon (and any other related information) to the mesh server 108, which the mesh server 108 may store. For example, referring to FIG. 4C, the unmanned vehicle 408 and the access point 493 may each detect and report to the local office 103 a beacon transmitted by access point 492. From these reports, the mesh server 108 may determine that one or more reports may have been received for a particular distressed device. According to some aspects, a reporting device may be the first device that detects and reports a beacon transmitted by a distressed access point. For example, referring to FIG. 4C, the access point 404 may be the first device to detect and report the beacon of access point 401. If it is determined that the reported beacon may be the first beacon reported for that distressed device, the process 500 may continue to step 520, which will be described below in more detail. It if is determined that the reported beacon might not be the first beacon reported for that distressed device, the process 500 may continue to step 514.

At step 514, the mesh server 108 may compare information associated with the current reporting device (e.g., the device that is currently reporting the detected beacon for the distressed device) with information associated with any of the other reporting device (e.g., devices that have previously reported the detected beacon for the distressed device). For example, the mesh server 108 may compare signal strength, loads, capacity, locations, bandwidth, limitations, type of device, type of data being transmitted, type of connection etc. of the various devices to determine whether the current reporting device is more suitable to provide network connectivity to the device. The mesh server 108 may also compare the types of reporting devices. For example, one device may be a network vehicle, another device may be a modem, another device may be a hot spot, etc.

At step 516, the mesh server 108 may determine whether the current reporting device may be better suited to service the distressed device than the other reporting devices that have previously reported the distressed device's beacon. According to some aspects, a priority may be given to a type of device, and the mesh server 108 may base this determination off of the priority. For example, referring to FIG. 4C, the network vehicle 408 may have a lower priority than the access point 493 (or other device) for servicing the access point 492. In other aspects, a network vehicle might have a higher priority than an access point or other device. According to some aspects, the mesh server 108 may determine which device may be better suited to service the distressed device using any information, such as any information determined or used in step 514. If it is determined that the current reporting device might not be a better suited to service the distressed device than the other reporting devices that have previously reported the distressed device's beacon, the process 500 may return to step 506. If it is determined that the current reporting device may be a better suited to service the distressed device than the other reporting devices that have previously reported the distressed device's beacon, the process may continue to step 518.

At step 518, the mesh server 108 may instruct any another reporting device (e.g., not the current reporting device) to stop servicing the distressed device.

At step 520, the mesh server 108 may determine whether a network vehicle may have been affected. For example, at step 518, if a network vehicle may have been previously servicing a distressed device, and was instructed to stop servicing the distressed device, then the mesh server 108 may determine that a network vehicle may be affected (e.g., because the network vehicle went from servicing the distressed device to not servicing the distressed device). In another example, at step 512, it may be determined that a network vehicle may report the first beacon for a distressed device, and thus the mesh server 108 may determine that a network vehicle (e.g., the reporting network vehicle) may be affected. In another example, at step 518, a network vehicle may be the current reporting device, and the mesh server 108 may determine that the network vehicle may be the best suited device for providing services. In such cases, the mesh server 108 may determine at step 520 that that network vehicle may be affected. In another example, the mesh server 108 may determine that a network vehicle might not have been affected if only access points (e.g., non-mobile access points) may be affected. If it is determined that a network vehicle might not have been affected (e.g., because the device reporting the first beacon may be a stationary access point, etc.), then the process 500 may continue to step 528, which will be described below in more detail. If it is determined that a network vehicle may have been affected, then the process may continue to step 522.

At step 522, the mesh server 108 may determine the locations of one or more network vehicles (e.g., the network vehicles currently servicing the location associated with the network outage, etc.) and of one or more of the reported beacons. For example, the mesh server 108 may determine a location of a network vehicle by determining a GPS location of the network vehicle. According to some aspects, the mesh server 108 may determine a location of a reported beacon by determining a location of a reporting device that reported the beacon, and estimating the location of the reported beacon based on this location. In another example, the mesh server 108 may determine a location of a reported beacon by inspecting information transmitted in reporting messages and beacons, such as location information and the like.

At step 524, the mesh server 108 may determine an optimal location (or locations) for any or all of the network vehicles to operate and service distressed devices and send these network vehicles to this optimal location. In one example, this optimal location may be a location close to a network signal (e.g., Wi-Fi signal) and close to the network outage area. In another example, an optimal location may be a location that provides network coverage to the most devices in an area associated with a network outage. An optimal location may be a location that provides network coverage to user having a higher priority than other uses. For example, a hospital may need access to network resources before a customer's home, and thus, the hospital may have a higher priority than the customer's home. In the event of a network outage, an optimal location for the placement of network vehicles may be a location that provides network connectivity for the hospital before providing network connectivity for the customer's home. According to some aspects, users or premises may be prioritized from highest to lowest by first having hospital customers, then medical customers (e.g., customers who have medical devices that require network connectivity to properly function, such as implantable wireless devices, etc.), then emergency relief customers (first responders, ambulances, police, etc.), then business customers (restaurants, convenience stores, law offices, etc.), then home owners. For example, the local office 103 or other entity may input in to the network vehicles 407-09 the coordinates of one or more of these locations, and the network vehicles 407-09 may deploy to these locations to provide network access to devices in proximity to these locations.

In another example, the network vehicles 407-09 may deploy to locations associated with previously working Wi-Fi hotspots. For example, a public Wi-Fi hotspot may network connectivity. After determining that this Wi-Fi hotspot has lost network access, the local office 103 or other entity may deploy one or more network vehicles to the location (or proximate location) of the Wi-Fi hotspot to provide network connectivity to devices in proximity to this location.

In another example, a technician (e.g., associated with the local office 103 or other entity) may initiate or deploy one or more of the network vehicles 407-09 in a geographical location that may be located proximate to a network outage area. For example, the technician may turn on the network vehicles 407-09, program into the network vehicles 407-09 location information (e.g., coordinates, access point locations/ranges, etc.) associated with a network outage, and deploy the network vehicles 407-09. The network vehicles 407-09 may then move or deploy to the location associated with the network outage to provide network coverage to devices in the area. According to some aspects, the technician may deploy non-moving network vehicles 407-09 to provide network coverage to one or more devices. For example, the technician may place stationary network vehicles 407-09 (e.g., disk-shaped or rock-shaped) in areas associated with the network outage (e.g., close to access points that are not connected to the network, such as network 100).

According to some aspects, the network vehicles 407-09 may provide saturation coverage to coverage areas that have become overburden with network activity or requests. According to some aspects, network saturation may occur at (or in locations associated with or proximate to) events in which a large number of people attend, such as concerts, sporting events, parades, flash crowds, inaugurations, etc. In such a situation, devices at or around these events may flood a network's resources, such that the network might not be able to provide network connectivity (e.g., adequate access to the network) to one or more of these devices. In such a situation, the network vehicles 407-09 (e.g., via instruction from the local office 103 or other entity) may deploy to or around these locations to provide network coverage to these devices. The network vehicles 407-09 may then set themselves up in an optimal mesh network (discussed herein above and below) to provide or intensify network coverage and connectivity in or around this location. According to some aspects, a network vehicle may be configured to provide network access to a particular number of devices. For example, a network vehicle may be configured with a beacon-per-vehicle characteristic or value that may describe the maximum number of devices that may be routed via that network vehicle. According to some aspects, the local office 103 or other entity may set the beacon-per-vehicle value for one or more devices. In some situations, whenever the beacon-per-vehicle value has been satisfied (e.g., the maximum number of devices are connected to a network vehicle), the local office 103 may determine that there may be a network saturation at or associated with a location. In such a situation, the local office 103 (or other entity) may deploy one or more network vehicles to the location associated with the network saturation. According to some aspects, the network vehicles may self-deploy to the location associated with the network saturation. According to some aspects, the local office 103 or other entity may change (e.g., increase) the beacon-per-vehicle value of one or more network vehicles after detecting network saturation, which may allow the one or more network vehicles to provide network access to more network vehicles. According to some aspects, the local office 103 or other entity may also decrease the beacon-per-vehicles value in response to not detecting network saturation.

According to some aspects, after detecting beacon signals, the network vehicles 407-09 (e.g., autonomously) may reconfigure a location of one or more of the network vehicles 407-09 based on the detected beacon signals. For example, the reconfiguration could be based on whether a signal strength of the detected beacons. This reconfiguration may provide for more optimal transmission of information to or from the access points 401-06.

At step 528, the mesh server 108 may instruct the reporting device (e.g., the device currently reporting the beacon, such as a network vehicle or access point) to begin servicing the distressed device (the device transmitting the beacon). The instruction sent to the reporting device may include instructions to begin establishing an emergency mesh network by connecting to the adjacent access point, network vehicles, etc. that might not be connected to the network or may have lost network connectivity. According to some aspects the mesh server 108 may send an instruction to a device (e.g., an access point or network vehicle) that may still be connected to the network (e.g., the network 100) to connect to a device (e.g., the access points 401-06 or the network vehicles 407-09) that might not be connected to the network.

At step 530, the reporting device may begin servicing the distressed device. For example, a reporting access point (e.g., a neighbor's modem) may connect to a distressed access point (e.g., a user's modem) and provide network connectivity to that distressed access point. In another example, a reporting network vehicle may connect to and provide network connectivity to a distressed access point. According to some aspects, referring to FIG. 4C, the local office 103 or other entity may connect to the access points 401-06 via the network vehicles 407-09. For example, the local office 103 or other entity, via a network (e.g., network 100), may transmit information (e.g., internet resources, media content, other content, etc.) via the network vehicles 407-09 and other devices (e.g., access points, wireless hotspots, etc.) to the one or more access points 401-06 (some of such connections are shown above and hereinafter). The network vehicle 409 may be directly connected to the network associated with the local office 103 or other entity, and the network vehicle 409 may retrieve information from this network to provide to downstream devices. The downstream devices, such as access points 401-06, may then receive this information. The downstream devices, such as access points 401-06, may transmit information via the network vehicles 407-09 and other devices to the network associated with the local office 103 or other entity.

According to some aspects, the network vehicles 407-09 may establish a wireless connection (e.g., Wi-Fi, satellite, etc.) to the access points 401-06 by authenticating the access points and establishing a secure link to the access points. For example, a network vehicle may authenticate an access point and may establish a secure link to the access point. The type of connection provided by the network vehicles 407-09 may depend on one or more operating conditions of the access point. For example, an access point may have lost power and lost access to the network's backhaul or backbone. In this case, the network vehicle may act as a self-powered part of a mesh network established to relay Wi-Fi (or other wireless) signal back to a network node that has power and backhaul. This network node may be the nearest node to the network vehicle. The network vehicle may then provide power and backhaul access to the access point. In another example, the access point may have power but might not have access to the network's backhaul or backbone. In this case, the network vehicle may provide network backhaul access to the access point (and may search for other failures in other parts of the area). According to some aspects, the distressed device may still transmit the emergency beacon even though the distressed device may have network connectivity via an adjacent access point or network vehicle.

At step 532, the mesh server 108 may determine whether the distressed device (e.g., the device broadcasting the emergency beacon) has reestablished the original (or different) connection to the network (e.g., without one of the reporting devices). For example, the local office 103 or other entity may determine whether there is a change in the number, strength, or location of emergency beacons detected by the network vehicles 407-09 or the number of devices connected to the network by the local office 103 or other entity (e.g., via the mesh server 108). In another example, the mesh server 108 may identify which access points are still connected to the network by sending requests to verify network connectivity. If the mesh server 108 does not receive a response to this request from an access point, then the mesh server 108 may determine that that access point is still not connected to the network. In another example, referring to FIG. 4C, the access points 401-06 may have been connected to network 100 via a wired connection, which had been damaged, cut, or otherwise not properly functioning, thereby not providing to the access points 401-06 access to the network 100. The mesh server 108 may determine whether this wired connection has been reestablished (e.g., via repair) by determining whether this device may be now receiving information over the network (e.g., without one of the reporting devices). According to some aspects, the access points 401-06 may establish a connection to the network 100 via some other manner, such as a different wired connection, a different wireless connection, and the like If it is determined that the distressed device might not be connected to the network without the help of one of the reporting devices, then the process 500 may return to step 530. If it is determined that the distressed device may be connected to the network without the help of one of the reporting devices, then the process 500 may continue to step 534.

At step 534, the mesh server 108 may instruct the reporting device providing network connectivity to the distressed device to tear down (e.g., stop, disconnect, etc.) the connection. For example, referring to FIG. 4C, the mesh server 108 may instruct the network vehicle 409 to tear down a connection to access point 406 if access point 406 re-connected to the network (e.g., via an original or different connection). In another example, the mesh server 108 may instruct the access point 493 to tear down the connection to access point 492 if access point 492 re-connected to the network (e.g., via an original or different connection). According to some aspects, a network vehicle or access point that may be connected to a distressed device may disconnect from that device after the distressed device re-connects to the network (e.g., via a wired connection, etc.) because the distressed device might not transmit an emergency beacon signal after reconnecting to the network (e.g., via the wired or other connection). That network vehicle may then send a message to the local office 103 or other entity indicating that the network vehicle has disconnected from that access point.

At step 536, the mesh server 108 may determine whether the servicing device may be a network vehicle. If it is determined that the servicing device was not a network vehicle, then the process may return to step 506. If it is determined that the servicing device was a network vehicle, the process may continue to step 538.

At step 538, the mesh server 108 may determine whether the servicing network vehicle may be servicing other distressed devices (e.g., directly or indirectly via other servicing devices). If it is determined that the network vehicle is not servicing other distressed devices, then the process may continue to step 546, where the mesh server 108 may release the network vehicle, such as from the location associated with the network outage. If it is determined that the network vehicle is servicing other distressed devices, then the process 500 may continue to step 542.

At step 542, the mesh server 108 may determine the locations of one or more network vehicles (e.g., the network vehicles currently servicing the location associated with the network outage, etc.) and of one or more of the reported beacons. For example, the mesh server 108 may determine a location of a network vehicle by determining a GPS location of the network vehicle. According to some aspects, the mesh server 108 may determine a location of a reported beacon by determining a location of a reporting device that reported the beacon, and estimating the location of the reported beacon based on this location. In another example, the mesh server 108 may determine a location of a reported beacon by inspecting information transmitted in reporting messages and beacons, such as location information and the like. Step 542 may be similar to the step 522.

At step 544, the mesh server 108 may determine an optimal location (or locations) for any or all of the network vehicles to operate and service distressed devices and send these network vehicles to this optimal location. According to some aspects, the network vehicles 407-09 (e.g., autonomously or via instructions from the local office 103 or other entity) may reconfigure a location of one or more of the network vehicles 407-09 based on detected beacon signals. Reconfiguration may provide for more optimal transmission of information to or from the access points 401-06. In one example, the network vehicles 407-09 may reconfigure their positions after an access point (to which the network vehicles 407-09 may be providing network connectivity) reestablishes a connection to the network independent of the network vehicles 407-09 (e.g., re-connects to a repaired cable plant, termination system, or the like). Step 544 may be similar to the step 524. The mesh server 108 may instruct the network vehicles to go to new locations (e.g., reconfigure) based on the lack of detected beacons transmitted by distressed devices (e.g., because these devices may have reconnected to the network). The process may then return to step 506.

Referring back to step 506, if it is determined that no beacon was reported or detected, the process 500 may continue to step 548.

At step 548, the mesh server 108 may identify distressed devices associated with the network outage location, such as devices not connected to the network. For example, after a user informs the local office 103 of a network outage associated with the user's device, the mesh server 108 may identify the specific device based on information provided by the user, on account information, etc. According to some aspects, a device might not respond to a ping transmitted by the mesh server 108. In such a case, the mesh server 108 may determine a location based on network maps that show locations of users and of user devices. According to some aspects, a device initially determined to be not connected to the network may reconnect to the network. For example, a user might have accidentally disconnected an access point from a wired connection and may reconnect the device to the wired connection. In another example, the device may miss a ping request transmitted by the mesh server 108, but may actually still be connected to the network, and may respond to a subsequent ping or other request transmitted by the mesh server 108. If the mesh server 108 might not be able to identify any distressed devices associated with the network outage location, then the process 500 may return to step 506. If the mesh server 108 may be able to identify any distressed devices associated with the network outage location, then the process 500 may continue to step 550.

At step 550, the mesh server 108 may group the distressed devices into one or more groups. These groups may be based on a device's location, a device's properties, a device type, and the like. For example, devices of a particular type (e.g., a specific modem model) may be grouped together. In another example, devices having a particular type of connection (e.g., satellite or cellular) may be grouped together. In another example, devices having a common general location (e.g., within a mile radius of a point or location) may be grouped together. Any combination of these factors may be used to group devices. For example, devices located within a mile of a particular location having a satellite connection may be grouped together.

At step 552, the mesh server 108 may determine an area or location associated with a group of devices. For example, the location may be a midpoint on a map of the group. In another example, the location may be some other point within or outside of the group. In another example, the location may be based on one or more factors, such as predicted signal strength, type of devices within the group, type of connections devices within the group may have, geography or obstacles, distance to the group from a known area of network connectivity, and the like.

At step 554, the mesh server 108 may identify or determine a path to the determined location associated with the group of devices (e.g., from step 552). According to some aspects, the path may be determined from an area of known network coverage or connectivity to the determined location associated with the group of distressed devices. The path may be a minimum distance between the area of known coverage and the group of distressed devices, such as a substantially straight line. According to some aspects, the path might not be a minimum distance. The path may take into account one or more facts, such as geography, obstacles, and the like.

At step 556, the mesh server 108 may instruct a network vehicle to a point on the path. For example, this point may be a point nearest to an area of known network connectivity. In such a case, the network vehicle may connect to the network via the area of known connectivity. For example, if the network vehicles has a known wireless range of one mile, then the mesh server 108 may instruct the network vehicle to a location located approximately one mile away from the area of known network connectivity, and located on the identified path.

According to some aspects, the mesh server 108 may instruct a subsequent network vehicle to a point on the path. For example, the mesh server 108 may instruct a subsequent network vehicle to a point on the path that maximizes the distance between the network vehicles, while still connecting to the network. This maximized distance may be based on the wireless ranges of all or a portion of the network vehicles being used. According to some aspects, the location of subsequent network vehicles may be based on one or more factors, such as geography, obstacles, etc.

At step 558, the mesh server 108 may determine whether the network vehicle reports a new beacon detected from a distressed device. For example, the network vehicle may detect and report to the mesh server 108 a new beacon for a new device detected by the network vehicle. In another example, the network vehicle may forward to the mesh server 108 a message received from another device (e.g., another forwarding device or a reporting device) reporting or forwarding a detection of a new beacon from a distressed device. According to some aspects, a process beginning at step 508 may occur for each reported beacon. According to some aspects, the network vehicle might not detect any new beacons because the network vehicle might not be in range of any beacons or of any forwarding devices, and therefore might not have any beacons to report. In another example, if the network vehicles is connected to the network and approaches an area of one or more distressed devices, the distressed devices may connect to the network through the network vehicle (e.g., via the process beginning at step 508) until the network vehicle might not detect or receive any indication of newly detected beacons. This may be because of the distressed devices with the range of the network vehicle (or within a range of a distressed device connected to the network vehicle) may now be connected to the network via the network vehicle or may have had their beacons forwarded by the network vehicle. If the network vehicle reports a new beacon, then the process 500 may return to step 558 to determine if the network vehicle reports another new beacon. If the network vehicle does not report a new beacon, then the process 500 may continue to step 560.

At step 560, the mesh server 108 may update the network coverage area (e.g., the area having network connectivity). For example, during the step 558, the network vehicle might connect many more distressed devices to the network, and the mesh server 108 may update the network coverage area reflecting these connected devices (e.g., using location or other data that may be known to mesh server 108).

At step 562, the mesh server 108 may determine whether the updated network coverage area (e.g., a map) may include the group of devices (e.g., the targeted group identified in step 550 and associated with the location determined in step 552). For example, the updated network coverage area might not include the targeted group of devices if none of the devices in the updated network coverage area correspond with any of the devices identified as the devices that might have lost connectivity (e.g., at steps 548, 550, and 552). For example, the mesh server 108 may compare information (e.g., device location, device properties, device type, account information, other information, etc.) of devices in the updated network coverage area with information of devices identified in steps 548, 550, and 552. If the updated network coverage area may include the targeted group of devices, the process 500 may return to step 506. If the updated network coverage area might not include the group of targeted devices, then the process 500 may return to step 556.

According to some aspects, the process 500 may end after any step.

FIGS. 6A-6G illustrate various configurations of network systems (each configuration being identified as one of the systems 600a-g in FIGS. 6A-6G) comprising network vehicles 407-09 and access points 401-06 in accordance with one or more aspects described herein. FIGS. 6A-6G may illustrate the network system 400 after a failure, a loss, or a decrease in network connectivity of all or a portion of the network system 400, which may result in one more of the access points 401, 402, 404, and 405 losing network connectivity with the network 100 or the local office 103 or other entity via a distribution network, such as interfaces 104a-104c, termination systems, or lines (e.g., losing one or more connections such as shown in FIG. 4A).

Figure 6A:
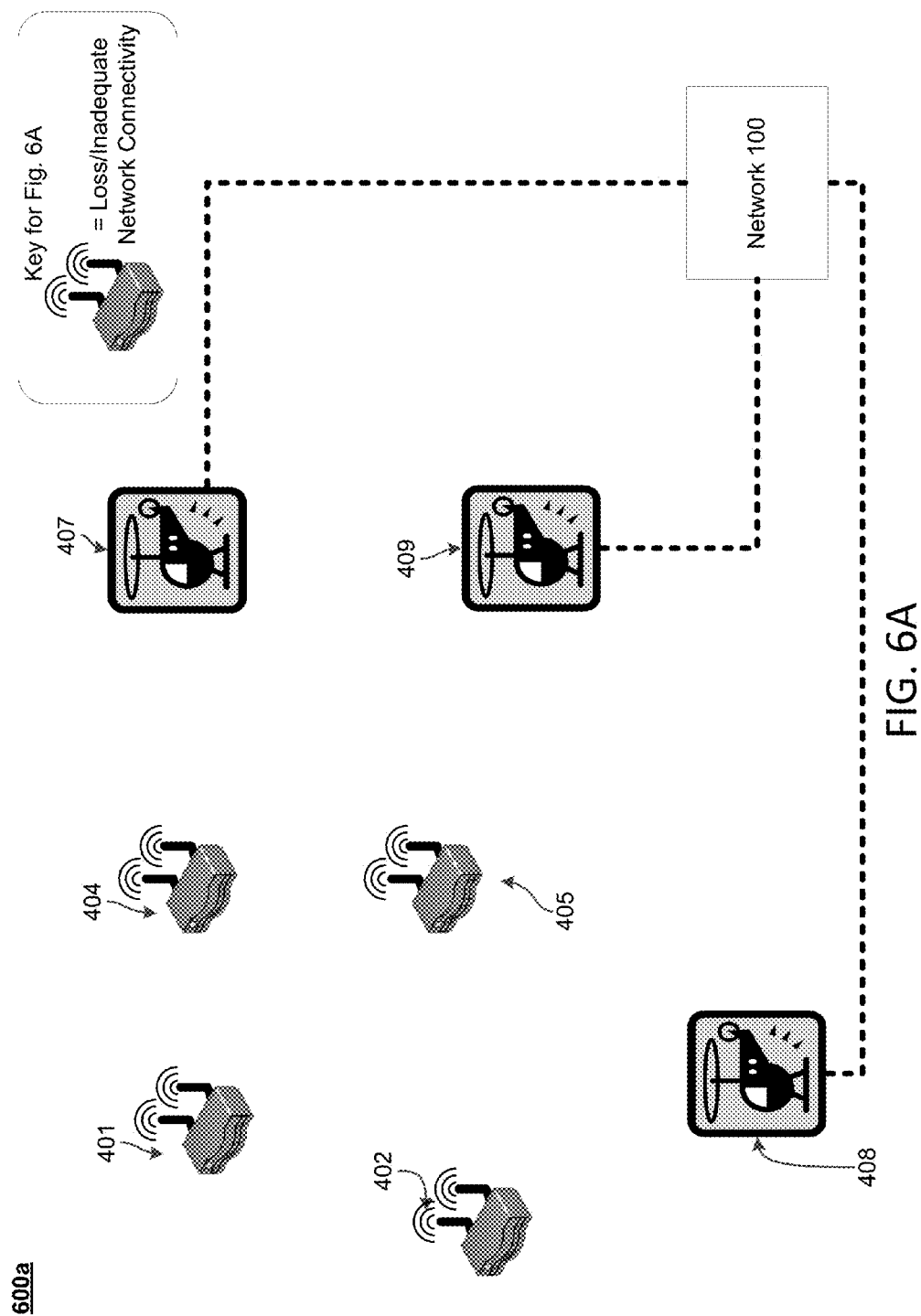
FIG. 6A illustrates an example network during network vehicle detection in accordance with aspects of the present disclosure.

FIG. 6A illustrates a network 600a during network vehicle detection in accordance with aspects of the present disclosure. The network 600a is illustrated with a first configuration of network vehicles 407-09 and access points 401, 402, 404, and 405 at a first time. System 600a may illustrate a time when the network vehicles 407-09 may be initially detecting or searching for beacon signals transmitted by the access points 401, 402, 404, and 405. For example, the network vehicles 407-09 may search for or detect any wireless beacon signals (e.g., emergency beacon signals) located within the respective wireless ranges of the network vehicles 407-09. According to some aspects, as illustrated in FIG. 6A with the dotted lines, the network vehicles 407-09 may be connected either directly or indirectly (e.g., via other devices) to a network 100, such as to the local office 103 or other entity (e.g., the mesh server 108). According to some aspects, the network vehicles 407-09 might not be connected to the local office 103 to the network, and may need to connect to other devices in order to connect to the network.

Figure 6B:
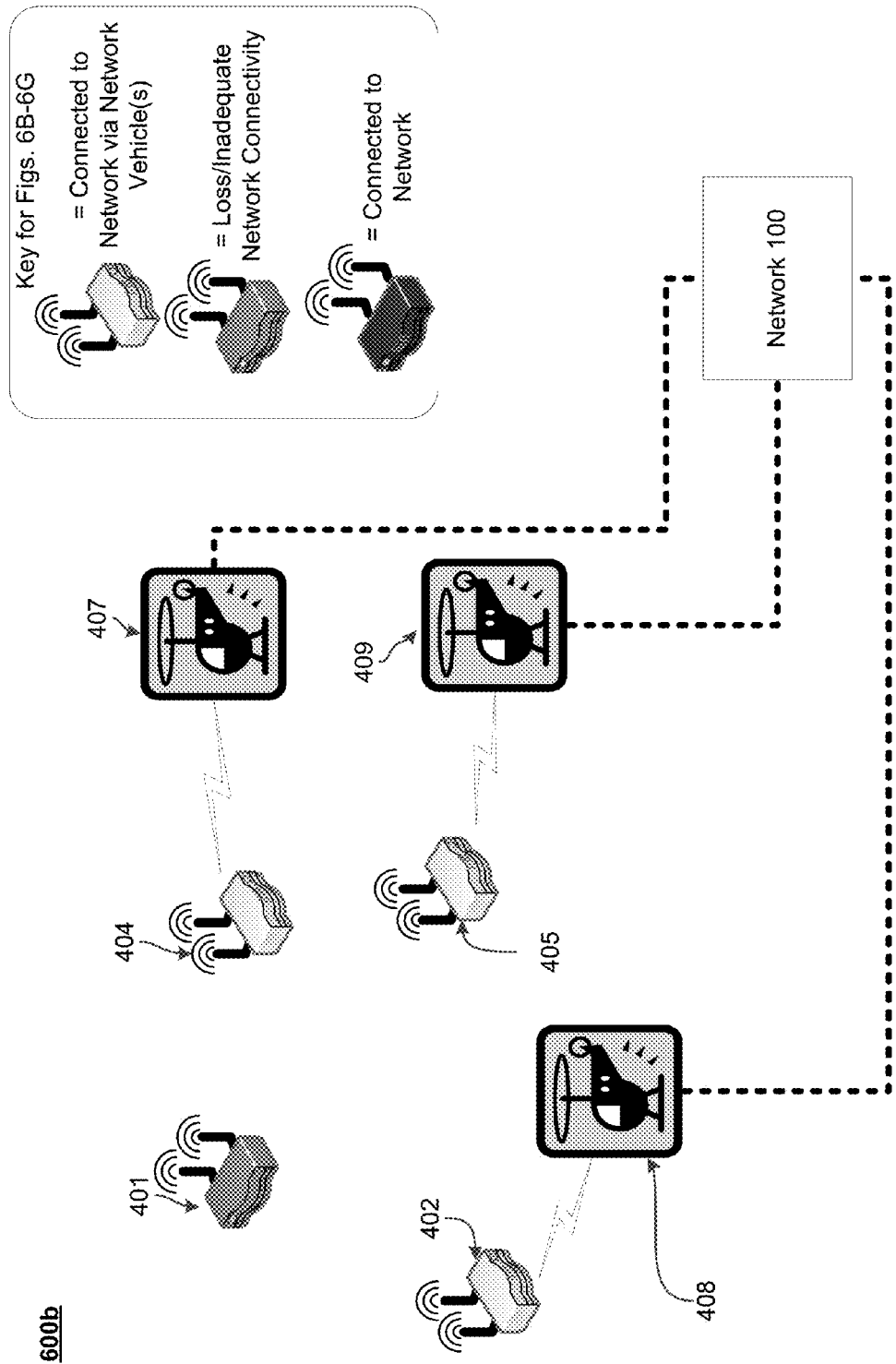
FIG. 6B illustrates an example network after network vehicle connection in accordance with aspects of the present disclosure.

FIG. 6B illustrates a network 600b after network vehicle connection in accordance with aspects of the present disclosure. The network 600b is illustrated with a second configuration of network vehicles and access points at a second time. System 600b may illustrate the network system 400 after a failure, a loss, or a decrease in network connectivity of all or a portion of network system 400. With regard to FIG. 6B, the network vehicle 408 may detect and report (e.g., to the mesh server 108) that the wireless beacon signal (broadcasted by the access point 402) is within the wireless range of the network vehicle 408, the network vehicle 409 may detect and report (e.g., to the mesh server 108) that the wireless beacon signal (broadcasted by the access point 405) is within the wireless range of the network vehicle 409, and the network vehicle 407 may detect and report (e.g., to the mesh server 108) that the wireless beacon signal (broadcast by the access point 404) is within the wireless range of the network vehicle 407. According to some aspects, the mesh server 108 or other entity may have sent a message to instruct or inform the network vehicles 407-09 of these distressed access point. After detecting these beacon signals, the network vehicle 408 may connect to the access point 402, the network vehicle 409 may connect to the access point 405, and the network vehicle 407 may connect to the access point 404. According to some aspects, the network vehicles 407-09 may be connected to a network (e.g., network 100) of a service provider (e.g., the local office 103 or other entity). For example, the network vehicles 407-09 may be directly connected to the network 100 or may be connected to the network 100 via one or more other devices (e.g., other access points, other wireless devices, other network vehicles, etc.). The network vehicles 407-09 may transmit network resources and other information between the network 100 and the access points 402, 404, and 405.

Figure 6C:
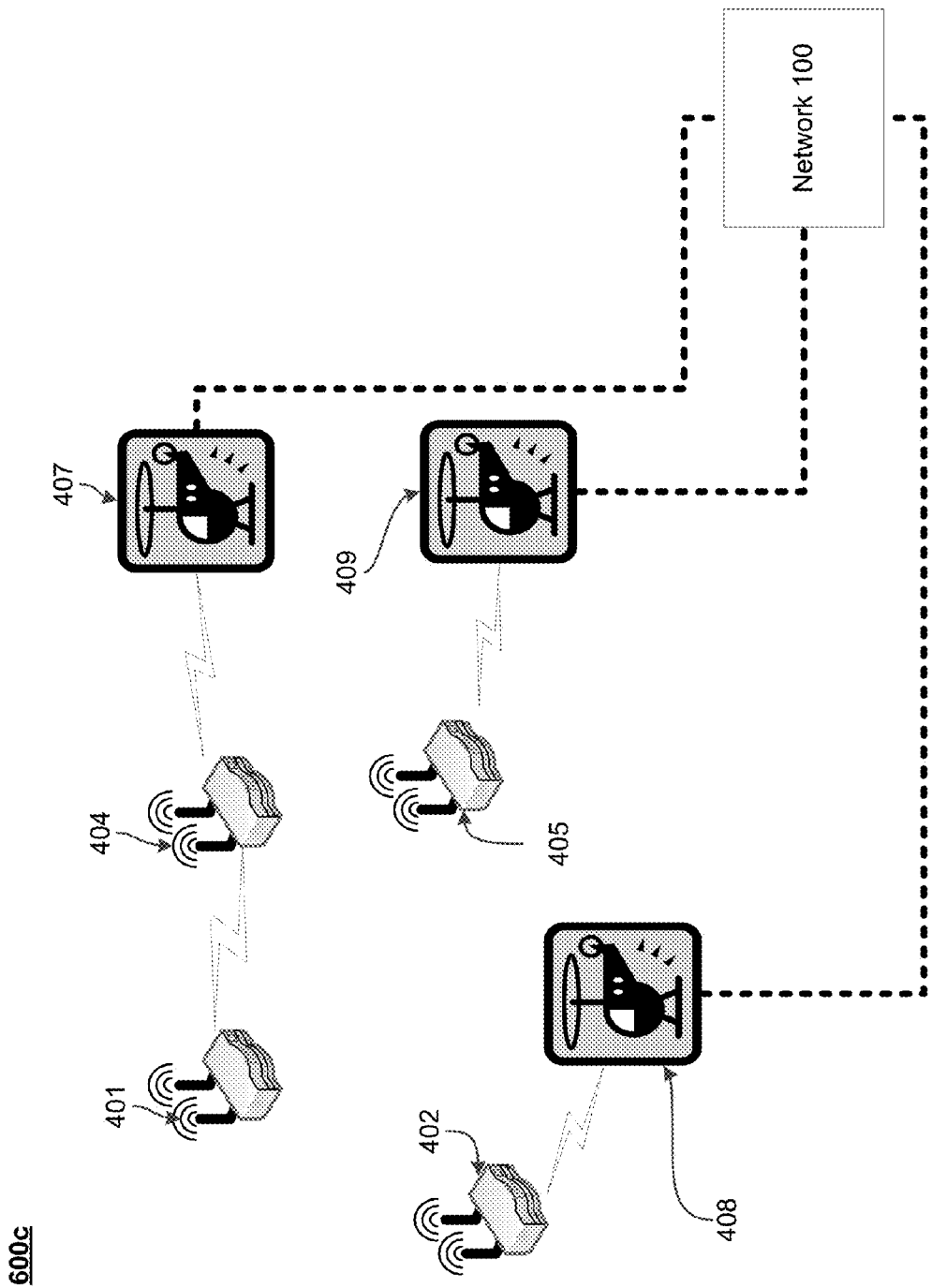
FIG. 6C illustrates an example network with message forwarding in accordance with aspects of the present disclosure.

FIG. 6C illustrates a network 600c with message forwarding in accordance with aspects of the present disclosure. The network 600c is illustrated with a third configuration of network vehicles and access points at a third time. As shown in FIG. 6C, another access point 401 may be detected or identified (e.g., via a beacon signal) by the access point 404. After the access point 404 detects the beacon signal of access point 401, the access point 404 may act as a reporting device and may report the beacon signal of access point 401 to the mesh server 108. Because access point 404 may be connected to the mesh server 108 (or other entity) via network vehicles 407, the access point 404 may report the beacon signal of access point 401 to the network vehicles 407. The network vehicle 407 may then forward a message up the chain indicating the detection of the beacon signal of access point 401. This message may include other information, such as location information of devices in the chain, which devices detected a reported beacon signal (e.g., the access point 404 detected the beacon signal of access point 401), which devices forwarded a reported beacon signal, load or capacity information of devices in the chain, types of device, device information, or other information. According to some aspects, the network vehicle 407 may forward the message to another device (e.g., an access point, a network vehicle, etc.) that may be connected to and providing network connectivity to the network vehicle 407. According to some aspects, the network vehicle 407 may forward the message to the mesh server 108 or other entity, such as in a situation in which the network vehicle 407 may be directly connected to the network. After the access point 404 detects the beacon signal of access point 401, the access point 404 may connect to access point 401. In such situations, the access point 404 (e.g., connected to the network via the network vehicle 407) may provide network connectivity to access point 401 via the network vehicle 407. The network vehicles 407-09 may transmit network resources and other information between the network 100 and the access points 401, 402, 404, and 405.

Figure 6D:
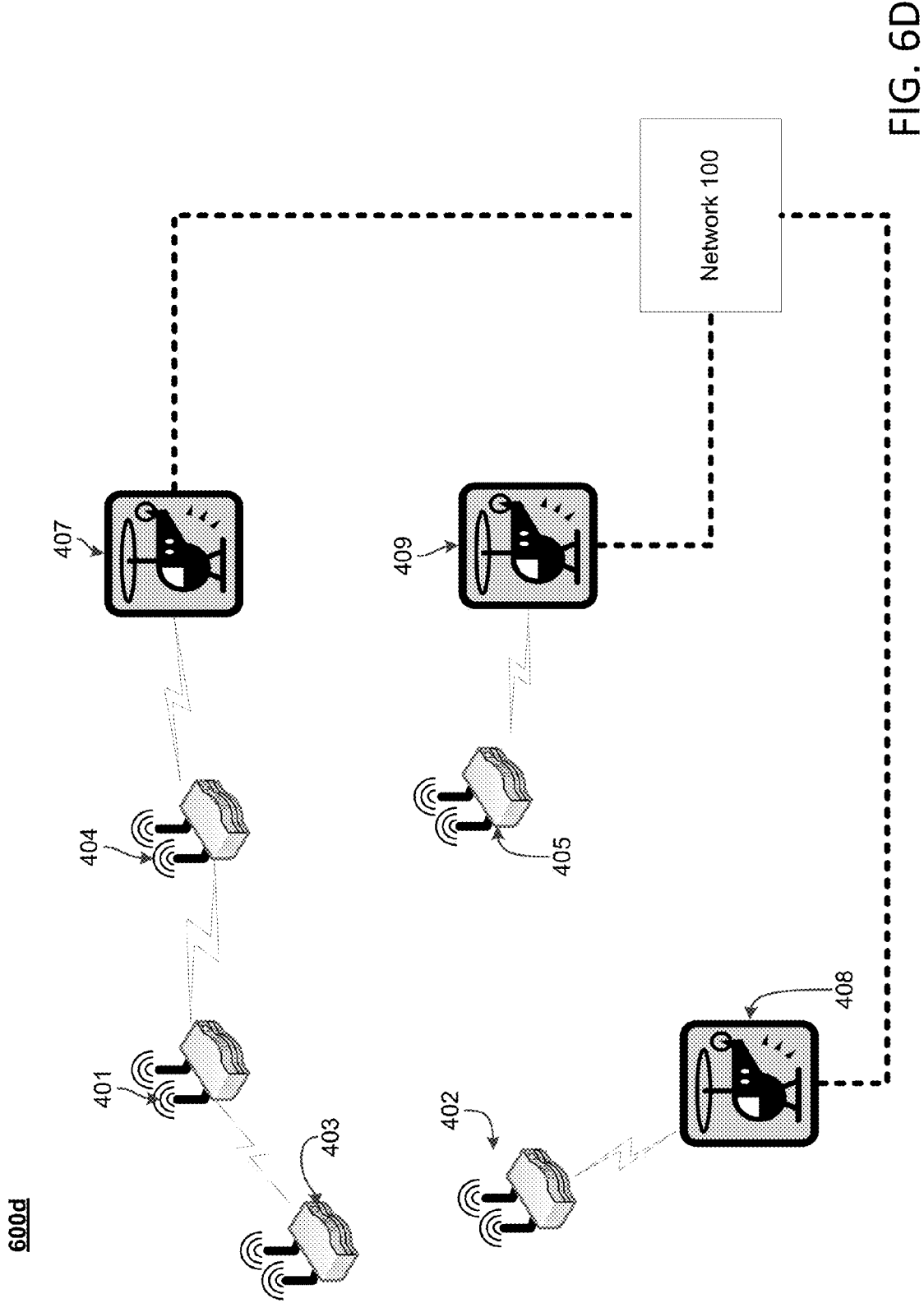
FIG. 6D illustrates an example network with router detection in accordance with aspects of the present disclosure.

FIG. 6D illustrates a network 600d with router detection in accordance with aspects of the present disclosure. The network 600d is illustrated with a fourth configuration of network vehicles and access points at a fourth time. As shown in FIG. 6D, another access point 403 may be detected or identified (e.g., via a beacon signal). According to some aspects, the access point 403 may be detected by the now network-connected access point 401, which may report the detection of the beacon of access point 403 to the mesh server 108 or other entity via the access point 404 and the network vehicle 407. According to some aspects, access point 402 may also detect and report the beacon of access point 403 to the network vehicle 408. In such situations, the mesh server 108 may receive two reports or messages indicating the detection of the access point 403 by two different devices, the access point 401 and the access point 402. The mesh server 108 may then determine which of these devices (e.g., the access points 401 and 402) may be better suited to service the access point 403. The network vehicles 407-09 may transmit network resources and other information between the network 100 and the access points 401-05.

According to some aspects, the first device that reported the detection of the access point 403 may initially service the access point 403. For example, if the access point 403 first reports the detection of the access point 402, then the access point 402 may connect to the access point 403. Then, if the access point 401 (e.g., after the access point 401 becomes connected to the network via the access point 404 and the network vehicle 407) reports the detection of the access point 402, the mesh server 108 may determine (e.g., based on factors such as load, capacity, type of network connection, type of data transmitted, distance, etc.) which of these two devices (e.g., access points 401 and 402) may be better suited to service the access point 403. For example, as shown in FIG. 4D, the mesh server 108 may determine that the access point 401 may be better suited to provide network connectivity to the access point 403 based on a type of connection provided by the access point 401 (e.g., Wi-Fi), which may be better suited for this situation than the type of connection provided by the access point 402 (e.g., cellular). For example, the access point 403 may be Wi-Fi enabled, but might not be cellular enabled. In such a case, the access point 403 might not be able to connect to the cellular connection provided by the access point 402, but may connect to the Wi-Fi connection of the access point 401.

According to some aspects, the mesh server 108 may find a device more closely connected to the network to be a better device to service a distressed device. For example, the access point 402 may be one node away from the network connection (e.g., the network vehicle 408 may be directly connected to the network), and the access point 401 may be two nodes away from the network connection (e.g., the network vehicle 407 may be directly connected to the network). In such a situation, the mesh server 108 may determine that a device being connected to the network via fewer nodes may be better suited to service a distressed device. In this example, the access point 402 may be better suited to service the access point 403.

In another situation, the mesh server 108 may use a device's load or capacity to determine whether a reporting device may be better suited to service a distressed device. For example, the network vehicle 407 may be servicing two devices (e.g., the access points 401 and 404), and the network vehicle 408 may be servicing one device (e.g., the access point 402). In such a situation, the mesh server 108 may determine that the access point 402 may be better suited to route network information via the network vehicle 408, because the network vehicle 408 may be servicing fewer devices that the network vehicle 407.

According to some aspects, after detecting or identifying this new access point 403, the network vehicles 407-09 may arrange themselves in a configuration different than the configuration shown in FIG. 6C. This new arrangement may provide a more optimal network coverage area provided by the network vehicles 407-09.

Figure 6E:
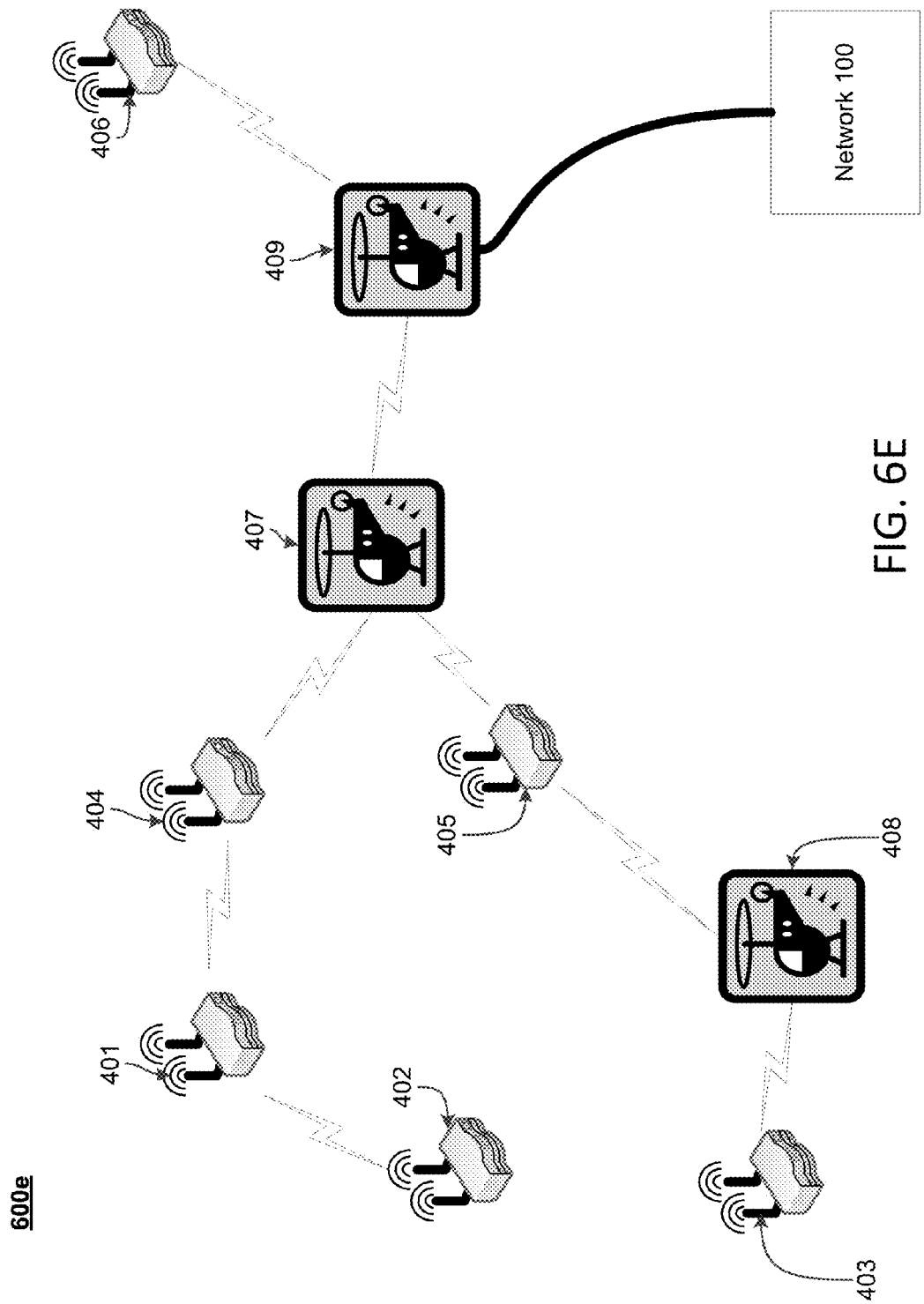
FIG. 6E illustrates an example network after reconfiguration in accordance with aspects of the present disclosure.

FIG. 6E illustrates an example network 600e after reconfiguration in accordance with aspects of the present disclosure. The network 600e is illustrated with a fifth configuration of network vehicles and access points at a fifth time. As shown in FIG. 6E, another access point 406 may be detected or identified by the network vehicles 407-09, or identified by the local office 103 or other entity which may instruct or inform the network vehicles 407-09 of this new access point 406. The network vehicles 407-09 may arrange themselves in a configuration different than the configuration shown in FIGS. 6B-6D. This configuration shown in FIG. 6E may provide for a more optimal network coverage area provided by the network vehicles 407-09. For example, the network vehicle 409 may move closer to the access point 406 to provide network connectivity to the access point 406. In this example, the network vehicle 409 may now be close enough to the network connection to directly (or otherwise) connect to the network (illustrated in FIG. 6E by the line connecting the network vehicle 409 and the local office 103). The network vehicle 409 may provide network connectivity to the access point 406, such as after reporting the beacon signal of access point 406. The network vehicle 407 may move and may connect to both the access point 404 and the access point 405. The network vehicle 407 may connect to the network vehicle 409, and the network vehicle 407 may provide network connectivity to the access points 404 and 405 via the connection to the network vehicle 409. The network vehicle 408 may move and may connect to both the access point 403 and the access point 405. According to some aspects, the access point 405 may report (e.g., via the network vehicles 407 and 409) a beacon transmitted by the network vehicle 408, which may signal that the network vehicle 408 might not be connected to the network. The access point 405 may then provide network connectivity to the network vehicle 408, and the network vehicle 408 may provide network connectivity to the access point 403. The access point 404 may provide network connectivity to the access point 401 and the access point 402. The network vehicles 407-09 may transmit network resources and other information between the network 100 and the access points 401-06.

Figure 6F:
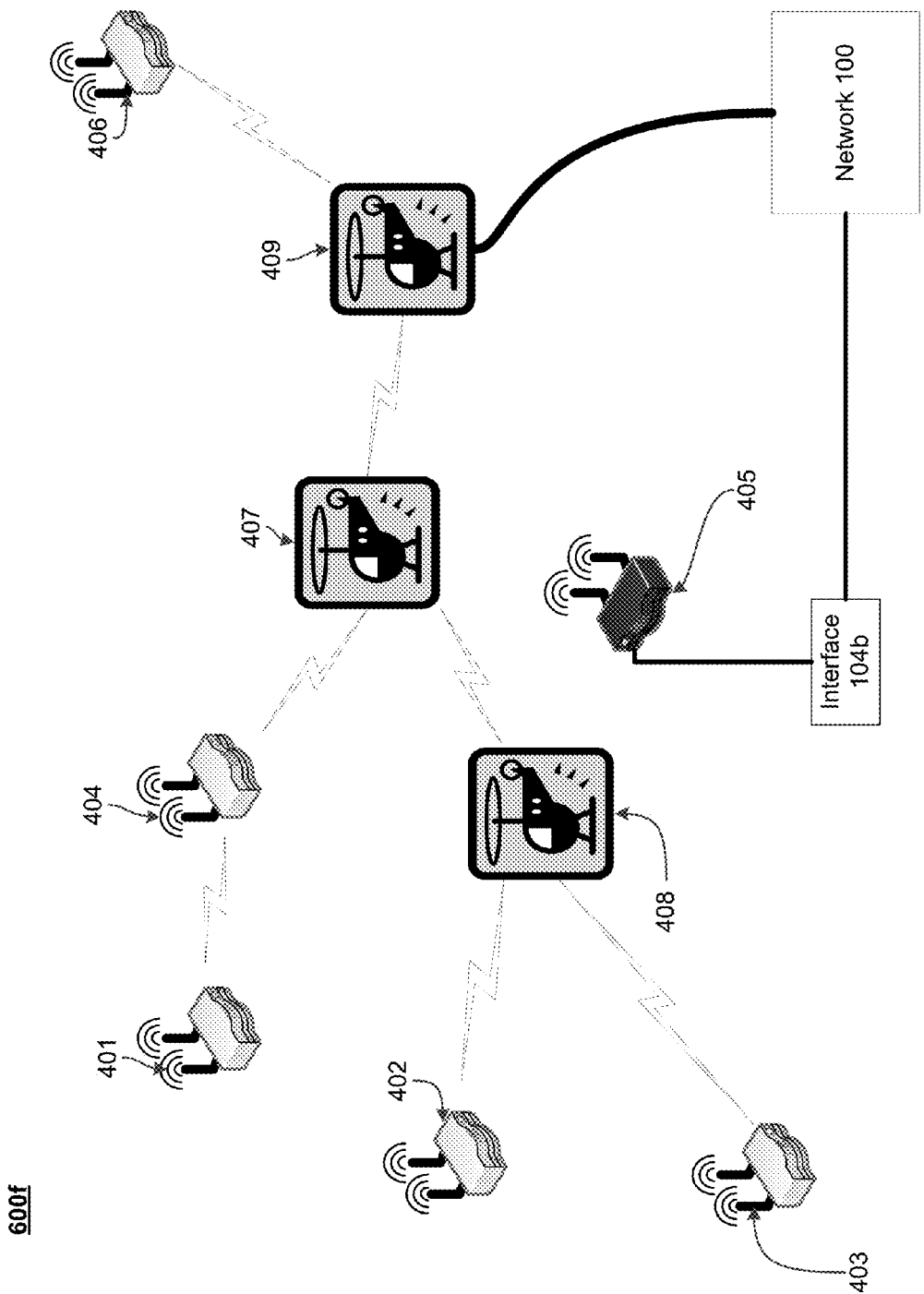
FIG. 6F illustrates an example network in which a network vehicle connects to another network vehicle in accordance with aspects of the present disclosure.

FIG. 6F illustrates a network 600f in which a network vehicle connects to another network vehicle in accordance with aspects of the present disclosure. The network 600f is illustrated with a sixth configuration of network vehicles and access points at a sixth time. As shown in FIG. 6F, the access point 405 may no longer be detected or identified by the network vehicles 407-09 (e.g., by network vehicle 408), or identified by the local office 103 or other entity. For example, the access point 405 may have reestablished a connection to the network (e.g., network associated with the local office 103 or other entity). According to some aspects, the access point 405 may have had a wired connection (e.g., shown in FIG. 4A) repaired or replaced, and may now access the network via the interface 104b. The access point 405 may then stop transmitting an emergency beacon signal, and thus, the network vehicle 408 may no longer detect the emergency beacon signal of access point 405. The network vehicle 408 may send a message to other devices or entities (e.g., network vehicle 407 or 409, the local office 103 or other entity, other access points, and the like) indicating that the emergency beacon signal of access point 405 is no longer detected. The network vehicles 407-09 may then reconfigured themselves in a more optimal position/location, such as shown in FIG. 6F. The network vehicles 407-09 may autonomously reconfigure themselves (e.g., without an additional instruction from another entity, such as the local office 103) or may reconfigure themselves after receiving an instruction from an entity such as the local office 103 (such as described above). This sixth configuration shown in FIG. 6F may provide for a more optimal network coverage area provided by the network vehicles 407-09. For example, the network vehicle 409 may provide network connectivity to the access point 406. The network vehicle 407 may move and may connect to the access point 404. The network vehicle 407 may connect to the network vehicle 409, and the network vehicle 407 may provide network connectivity to the access point 404 via the connection to the network vehicle 409. The network vehicle 408 may move and may connect to and provide network access to both the access point 402 and the access point 403. The access point 404 may provide network connectivity to the access point 401. The network vehicles 407-09 may transmit network resources and other information between the network 100 and the access points 401-04 and 406.

Figure 6G:
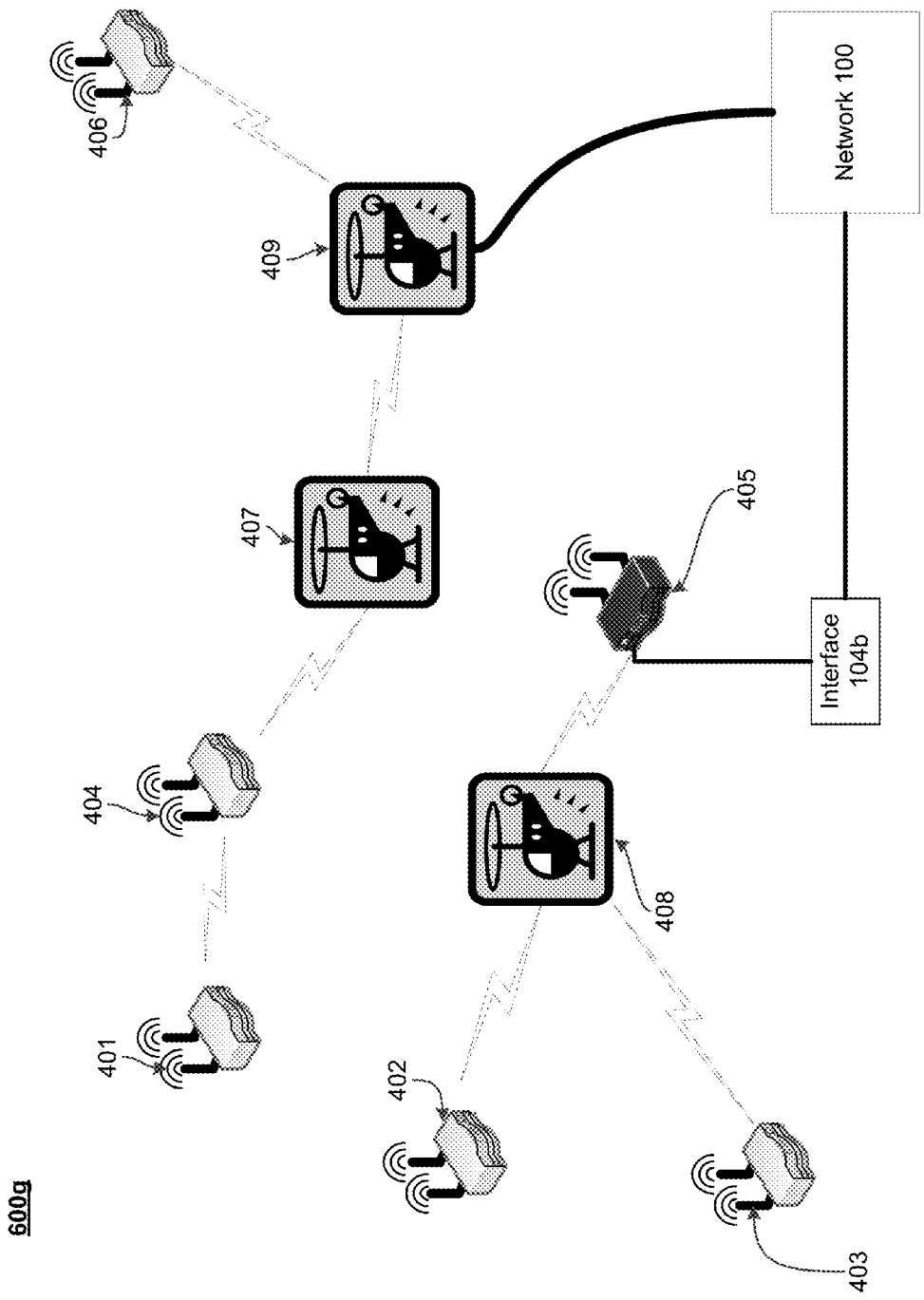
FIG. 6G illustrates an example network in which a network vehicle connects to a network via a router in accordance with aspects of the present disclosure.

FIG. 6G illustrates a network 600g in which a network vehicle connects to a network via a router in accordance with aspects of the present disclosure. The network 600g is illustrated with a seventh configuration of network vehicles and access points at a seventh time. As can be shown in FIG. 6G, the network vehicle 408 may no longer connect to the network vehicle 407, but might not connect to the access point 405. According to some aspects, after the access point 405 reestablishes the connection to the network 100 via the interface 104b, the access point 405 may detect and report a beacon transmitted by the network vehicle 408. The mesh server 108 may evaluate the two devices (e.g., the network vehicle 407 and the access point 405) that reported the beacon of network vehicle 408 to determine which of these two devices may be better suited to service the network vehicle 408. For example, the access point 405 may be a stationary access point (e.g., non-mobile), and the network vehicle 407 may be mobile (e.g., capable of self-movement). The mesh server 108 may determine that a stationary access point may have a higher priority than a mobile network vehicle, and then may instruct the network vehicle 407 to disconnect from the network vehicle 408, and instruct the access point 405 to connect to the network vehicle 408. According to some aspects, the mesh server 108 may determine that a wired connected device (e.g., the access point 405) may be better suited to connect to the network vehicle 408 than a non-wired connected (e.g., not directly connected to a wire) device (e.g., the network vehicle 407.

The network vehicles 407-09 may transmit network resources and other information between the network 100 and the access points 401-04 and 406.

Figure 7:
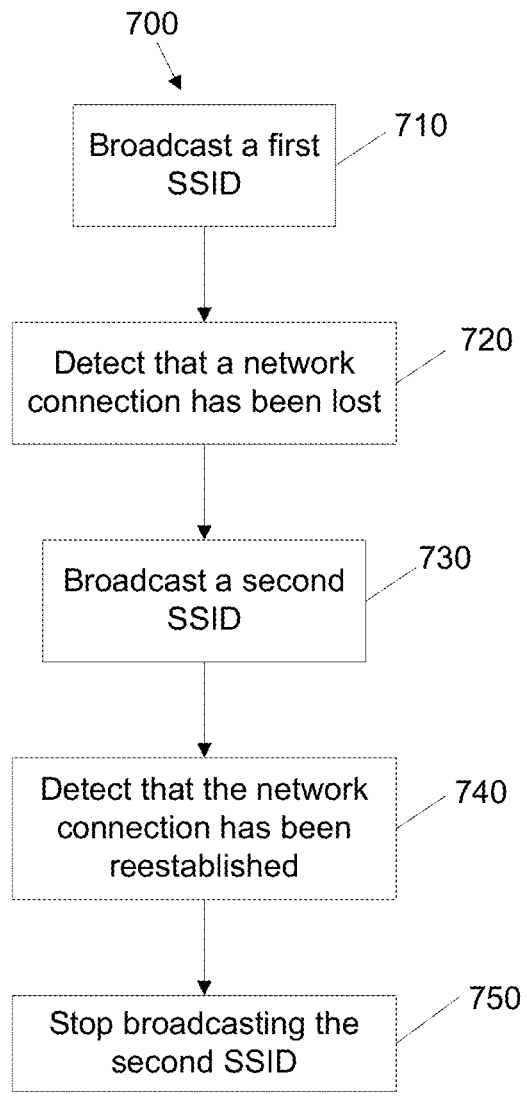
FIG. 7 is a flow diagram of a method for broadcasting a second SSID in accordance with aspects of the present disclosure.

FIG. 7 is a flow diagram of a method 700 for broadcasting a second SSID in accordance with aspects of the present disclosure. It should be understood that while the flow diagram of method 700 indicates a particular order of execution of operations, in some implementations, certain portions of the operations may be executed in a different order. Certain portions of the operations may be executed simultaneously. Further, in some implementations, additional operations or steps may be added to the method 700. Likewise, some operations or steps may be omitted.

At step 710, a router broadcasts a first SSID. For example, the first SSID may be broadcast during normal operations of the router, i.e., when the router is connected to the internet. The first SSID may be broadcast in response to detecting that the router is maintaining a network connection. At step 720, the router may detect that a network connection has been lost. For example, the router may lose the connection to the internet or a termination system. In one implementation, rather than losing the connection, the router may detect that the connection has slowed down or is not usable.

At step 730, the router may broadcast a second SSID. The second SSID may indicate that the network connection has been lost, or is no longer being maintained. In one implementation, the router broadcasts the first SSID and second SSID simultaneously. The second SSID may be broadcast in response to detecting that the network connection has been lost.

At step 740, the router may detect that the network connection has been reestablished. For example, the router may reconnect to the internet or termination system. In another example, the router may detect that a speed or a measure of reliability of the network is above a preset threshold. At step 750, the router may stop broadcasting the second SSID. For example, in response to detecting that the network connection has been reestablished, the router may stop broadcasting the second SSID.

Figure 8:
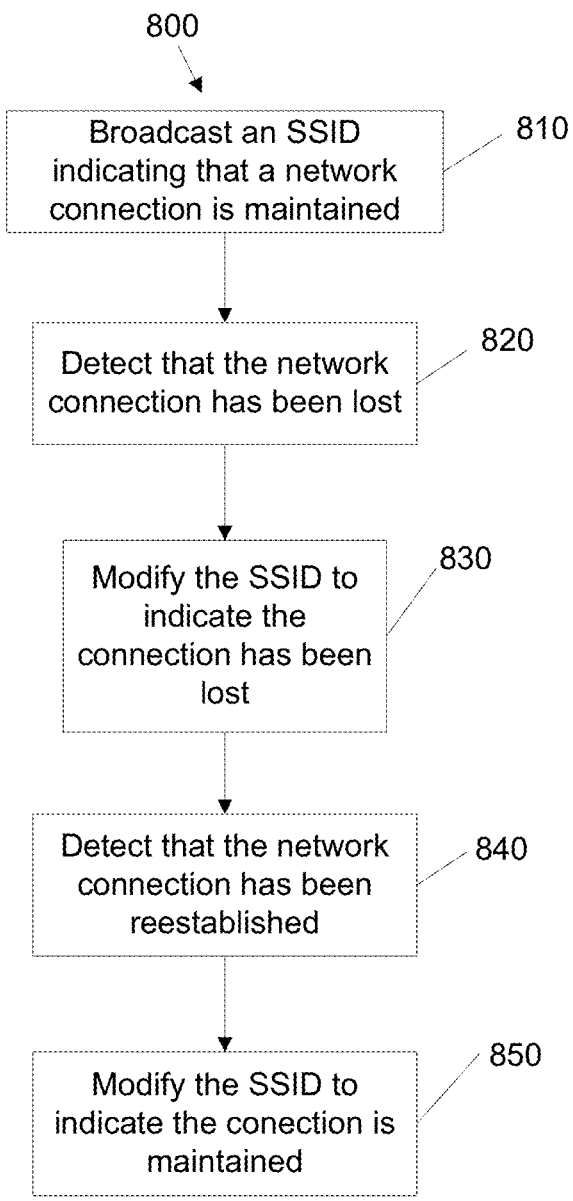
FIG. 8 is a flow diagram of a method for modifying an SSID in accordance with aspects of the present disclosure.

FIG. 8 is a flow diagram of a method for modifying an SSID in accordance with aspects of the present disclosure. It should be understood that while the flow diagram of method 800 indicates a particular order of execution of operations, in some implementations, certain portions of the operations may be executed in a different order. Certain portions of the operations may be executed simultaneously. Further, in some implementations, additional operations or steps may be added to the method 800. Likewise, some operations or steps may be omitted.

At step 810, a router broadcasts an SSID indicating that a network connection is maintained. For example, the SSID may be broadcast during normal operations of the router, i.e., when the router is connected to the internet. The SSID may be selected by a user. In one implementation, the lack of a textual indicator may indicate that the network connection is maintained. In this implementation, the presence of the textual indicator, which may be a predetermined or preset textual indicator, may indicate a loss of connectivity. At step 820, the router may detect that a network connection has been lost. Steps performed at step 820 may be similar to those performed at step 720, described above.

At step 830, the router may modify the SSID to indicate that the connection has been lost. The SSID may be modified in response to detecting that the network connection has been lost. For example, the network name broadcast by the router may be modified to indicate that the connection has been lost.

At step 840, the router may detect that the network connection has been reestablished. Similar steps to those performed at step 740, described above, may be performed at step 840. At step 850, the router may modify the SSID to indicate that the connection is maintained. For example, the SSID may be modified to match the SSID broadcast at step 810.

Although example embodiments are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   causing a mobile network vehicle device to move to a geographical location;
   detecting, by the mobile network vehicle device, an emergency beacon signal indicating a loss of connectivity to a network, wherein the emergency beacon signal is transmitted by a distressed access node and comprises a service set identifier (SSID), or a basic service set identifier (BSSID);
   determining the distressed access node corresponding to the emergency beacon signal;
   determining, by the mobile network vehicle device and based on the emergency beacon signal, a target location associated with the distressed access node;
   in response to the determining the target location associated with the distressed access node, causing the mobile network vehicle device to move to the target location;
   connecting, by the mobile network vehicle device, to the distressed access node; and
   transmitting, via the mobile network vehicle device, information between the distressed access node and the network.

2. The method of claim 1, wherein transmitting the information via the mobile network vehicle device comprises communicating via one or more intermediate mobile network vehicle devices.

3. The method of claim 1, wherein transmitting the information via the mobile network vehicle device comprises transmitting the information via a stationary network device.

4. The method of claim 1, wherein detecting the emergency beacon signal comprises detecting a broadcast beacon transmitted by the distressed access node, the broadcast beacon comprising a 802.11u Access Network Query Protocol (ANQP) query element.

5. The method of claim 1, wherein detecting the emergency beacon signal comprises detecting the service set identifier (SSID) comprising a predetermined textual indicator corresponding to the loss of connectivity.

6. The method of claim 1, wherein determining the target location associated with the distressed access node further comprises:
   determining an expected coverage area associated with the distressed access node; and determining the target location based on the expected coverage area.

7. The method of claim 1,
wherein connecting to the distressed access node comprises connecting via a wireless connection to the distressed access node; and
wherein transmitting information between the distressed access node and the network comprises transmitting the information via the wireless connection.

8. The method of claim 1, wherein transmitting information between the distressed access node and the network comprises transmitting information between the distressed access node and the network via a first type of data connection and a second type of data connection different than the first type of data connection.

9. The method of claim 1, wherein the mobile network vehicle device is associated with a vehicle that is configured to float in or on a liquid, to fly, for ground mobility, or combinations thereof.

10. The method of claim 1, further comprising:
detecting that the distressed access node has reestablished connectivity to the network; and
disconnecting, by the mobile network vehicle device, from the distressed access node.

11. The method of claim 1, wherein the distressed access node has lost connectivity or has decreased connectivity to at least a portion of the network.

12. A method comprising:
causing a mobile network vehicle device to move to a geographical location;
detecting, by the mobile network vehicle device, a plurality of emergency beacon signals indicating a loss of connectivity to a network, wherein the plurality of emergency beacon signals are transmitted by a plurality of distressed access nodes and comprise a service set identifier (SSID), or a basic service set identifier (BSSID);
determining, via the mobile network vehicle device and based on the plurality of the emergency beacon signals, the plurality of distressed access nodes associated with a network outage;
determining, for each of the distressed access nodes, a corresponding expected coverage area;
determining, based on the expected coverage area, a target location;
in response to determining the target location, causing the mobile network vehicle device to move to the target location;
establishing, via the mobile network vehicle device and in response to detecting the plurality of emergency beacon signals indicating the loss of the connectivity to the network, a connection between a network service provider and the plurality of distressed access nodes; and
transmitting, via the mobile network vehicle device, information between the network service provider and the plurality of distressed access nodes.

13. The method of claim 12, further comprising generating a map based on the expected coverage area.

14. A system comprising: a mobile network vehicle device and a distressed access node,
wherein the mobile network vehicle device comprises:
one or more processors; and
memory storing instructions that, when executed by the one or more processors, cause the mobile network vehicle device to:
cause the mobile network vehicle device to move to a geographical location;
detect, by the mobile network vehicle device, an emergency beacon signal indicating a loss of connectivity to a network, wherein the emergency beacon signal is transmitted by the distressed access node and comprises a service set identifier (SSID), or a basic service set identifier (BSSID);
determine the distressed access node corresponding to the emergency beacon signal;
determine, by the mobile network vehicle device and based on the emergency beacon signal, a target location associated with the distressed access node;
in response to the determining the target location associated with the distressed access node, cause the mobile network vehicle device to move to the target location;
connect, by the mobile network vehicle device, to the distressed access node; and
transmit, via the mobile network vehicle device, information between the distressed access node and the network, and
wherein the distressed access node comprises:
one or more processors; and
memory storing instructions that, when executed by the one or more processors of the distressed access node, cause the distressed access node to transmit the emergency beacon signal.

15. The system of claim 14, wherein the emergency beacon signal comprises a 802.11u Access Network Query Protocol (ANQP) query element.

16. The system of claim 14, wherein the service set identifier (SSID) comprises a predetermined textual indicator corresponding to the loss of connectivity.

17. The system of claim 14, wherein the instructions in the memory of the mobile network vehicle device, when executed by the one or more processors of the mobile network vehicle device, further cause the mobile network vehicle device to:
determine an expected coverage area associated with the distressed access node; and
determine the target location based on the expected coverage area.

18. The system of claim 14 wherein the instructions in the memory of the mobile network vehicle device, when executed by the one or more processors of the mobile network vehicle device, further cause the mobile network vehicle device to:
connect to the distressed access node via a wireless connection; and
transmit the information between the distressed access node and the network via the wireless connection.

19. The system of claim 14, wherein the mobile network vehicle device is associated with a vehicle configured to float in or on a liquid, to fly, for ground mobility, or combinations thereof.

20. The system of claim 14, wherein the instructions in the memory of the mobile network vehicle device, when executed by the one or more processors of the mobile network vehicle device, further cause the mobile network vehicle device to:
detect that the distressed access node has reestablished connectivity to the network; and
disconnect, by the mobile network vehicle device, from the distressed access node.

* * * * *

UNITED STATES PATENT AND TRADEMARK OFFICE
CERTIFICATE OF CORRECTION

PATENT NO. : 10,015,041 B2
APPLICATION NO. : 14/857291
DATED : July 3, 2018
INVENTOR(S) : O'Reirdan et al.

It is certified that error appears in the above-identified patent and that said Letters Patent is hereby corrected as shown below:

On the Title Page

Page 2, Column 2, Other Publications, Line 7:
Please delete "2016/01131" and insert --2016/01/31--

In the Specification

Column 2, Detailed Description, Line 63:
Delete "computer readable" and insert --computer-readable--

Column 27, Detailed Description, Line 19:
After "like", insert --.--

In the Claims

Column 37, Claim 14, Line 59:
After "comprising:", insert --¶--

Signed and Sealed this
First Day of January, 2019

Andrei Iancu
*Director of the United States Patent and Trademark Office*